(12) United States Patent
Nakarmi et al.

(10) Patent No.: US 10,939,334 B2
(45) Date of Patent: Mar. 2, 2021

(54) SECURITY CONTEXT IN A WIRELESS COMMUNICATION SYSTEM

(71) Applicant: Telefonaktiebolaget LM Ericsson (publ), Stockholm (SE)

(72) Inventors: Prajwol Kumar Nakarmi, Sollentuna (SE); Karl Norrman, Stockholm (SE); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 278 days.

(21) Appl. No.: 16/321,563

(22) PCT Filed: Sep. 14, 2018

(86) PCT No.: PCT/EP2018/074871
§ 371 (c)(1),
(2) Date: Jan. 29, 2019

(87) PCT Pub. No.: WO2019/053185
PCT Pub. Date: Mar. 21, 2019

(65) Prior Publication Data
US 2020/0396650 A1 Dec. 17, 2020

Related U.S. Application Data

(60) Provisional application No. 62/559,245, filed on Sep. 15, 2017.

(51) Int. Cl.
*H04W 12/04* (2021.01)
*H04W 12/06* (2021.01)
(Continued)

(52) U.S. Cl.
CPC ....... *H04W 36/0038* (2013.01); *H04L 5/0055* (2013.01); *H04W 8/08* (2013.01);
(Continued)

(58) Field of Classification Search
CPC ......... H04W 12/06; H04W 12/040301; H04W 12/10; H04W 12/04
(Continued)

(56) References Cited

U.S. PATENT DOCUMENTS 8,934,356 B2 * 1/2015 Casati ............... H04W 36/0033
370/252
10,492,109 B2 * 11/2019 Xu ........................ H04L 5/0053
(Continued)

FOREIGN PATENT DOCUMENTS

| CN | 103139771 A | 6/2013 |
| RU | 2466503 C2 | 10/2011 |
| WO | WO2020035441 A1 * | 2/2020 |

OTHER PUBLICATIONS

"Network access security in next-generation 3GPP systems: A tutorial" C.B. Sankaran Published in: IEEE Communications Magazine ( vol. 47, Issue: 2, Feb. 2009) (Year: 2009).*
(Continued)

*Primary Examiner* — William D Cumming

(57) ABSTRACT

Core network equipment (16) is configured for use in a core network of a wireless communication system. The core network equipment (16) is configured to switch switching to using a new non-access stratum, NAS, security context between a user equipment (14) and the core network equipment (16). The core network equipment (16) is also configured to, during or in association with a handover procedure for handover of the user equipment (14), signal from the core network equipment (16) that the new NAS security context between the user equipment (14) and the core network equipment (16) is to be used as a basis for an access stratum (AS) security context between the user equipment (14) and radio access network equipment (12).

21 Claims, 24 Drawing Sheets

(51) Int. Cl.
| | |
|---|---|
| *H04W 12/10* | (2021.01) |
| *H04W 36/00* | (2009.01) |
| *H04W 76/25* | (2018.01) |
| *H04L 5/00* | (2006.01) |
| *H04W 8/08* | (2009.01) |
| *H04W 48/16* | (2009.01) |

(52) U.S. Cl.
CPC .......... *H04W 12/04* (2013.01); *H04W 48/16* (2013.01); *H04W 76/25* (2018.02)

(58) Field of Classification Search
USPC ........................................................ 370/252
See application file for complete search history.

(56) References Cited

U.S. PATENT DOCUMENTS

| | | | | |
|---|---|---|---|---|
| 10,512,005 | B2* | 12/2019 | Horn | H04W 12/06 |
| 10,771,978 | B2* | 9/2020 | Ben Henda | H04W 12/04031 |
| 2019/0104447 | A1* | 4/2019 | Horn | H04W 12/06 |
| 2020/0359280 | A1* | 11/2020 | Li | H04W 12/10 |
| 2020/0396650 | A1* | 12/2020 | Nakarmi | H04W 12/04 |

OTHER PUBLICATIONS

NEC, "pCR to TR 33.899: Solution for key issue #13.1", 3GPP TSG SA WG3 (Security) Meeting #88, Dali, China, Aug. 7, 2017, pp. 1-4, S3-172048, 3GPP.

ZTE et al., "Key hierarchy when using UP security function", 3GPP TSG SA WG3 (Security) Meeting #87, Ljublijana, Slovenia, May 15, 2017, pp. 1-9, S3-171054, 3GPP.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V1.2.0, Jul. 1, 2017, pp. 1-166, 3GPP, France.

3rd Generation Partnership Project, "3rd Generation Partnership Project; Technical Specification Group Radio Access Network; NG Radio Access Network (NG-RAN); NG Application Protocol (NGAP) (Release 15)", Technical Specification, 3GPP TS 38.413 V0.2.1, Aug. 1, 2017, pp. 1-81, 3GPP, France.

3rd Generation Partnership Project, "3rd Generation Partnership Project; Technical Specification Group Services and System Aspects; Procedures for the 5G System; Stage 2 (Release 15)", Technical Specification, 3GPP TS 23.502 V0.6.0, Aug. 1, 2017, pp. 1-148, 3GPP, France.

3rd Generation Partnership Project, "3rd Generation Partnership Project; Technical Specification Group Radio Access Network; NG Radio Access Network (NG-RAN); Xn application protocol (XnAP) (Release 15)", Technical Specification, 3GPP TS 38.423 V0.2.0, Jun. 1, 2017, pp. 1-57, 3GPP, France.

3rd Generation Partnership Project, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 15)", Technical Specification, 3GPP TS 29.274 V15.0.0, Jun. 1, 2017, pp. 1-369, 3GPP, France.

* cited by examiner

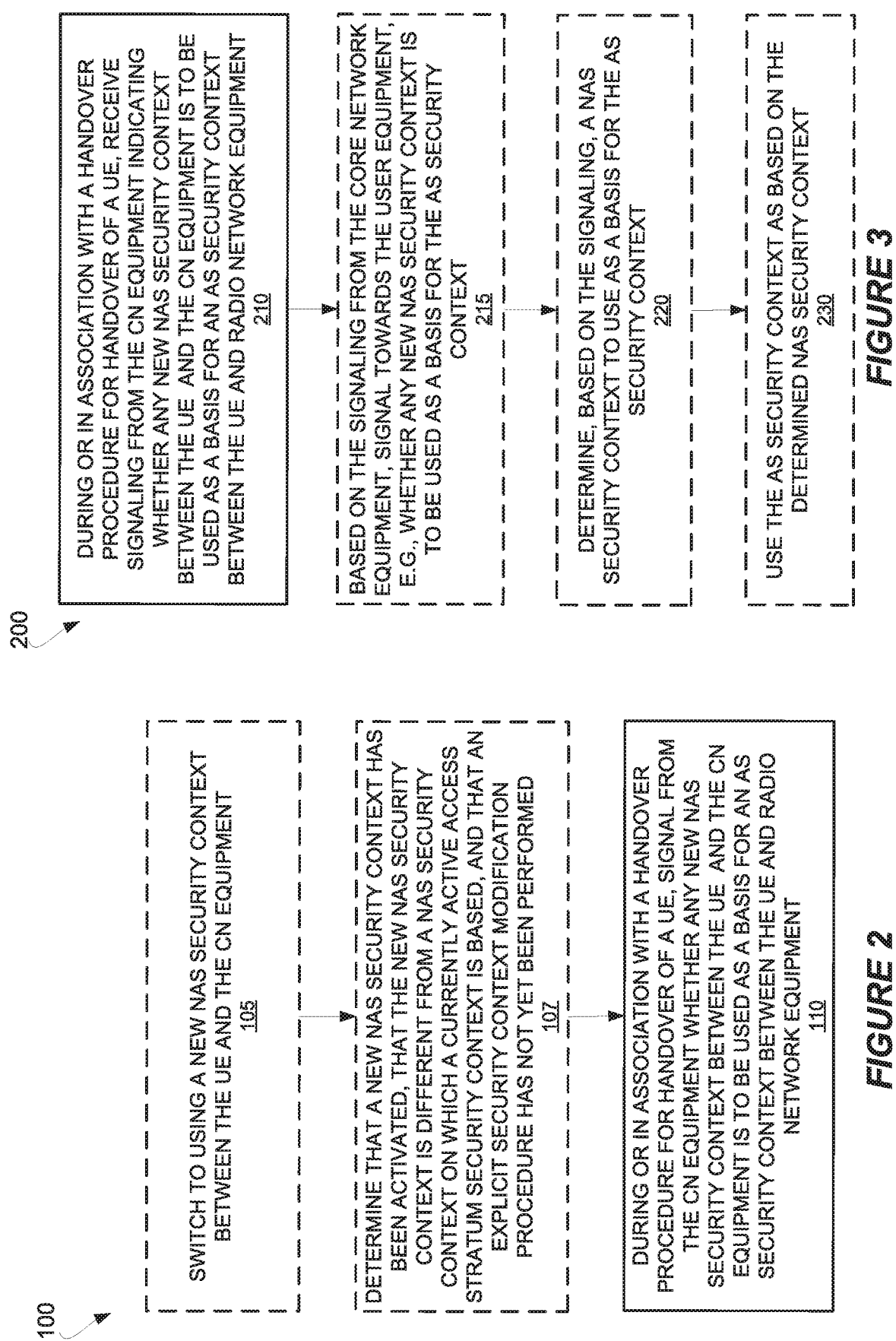

N2-handover

Xn-handover

Intra-cell handover

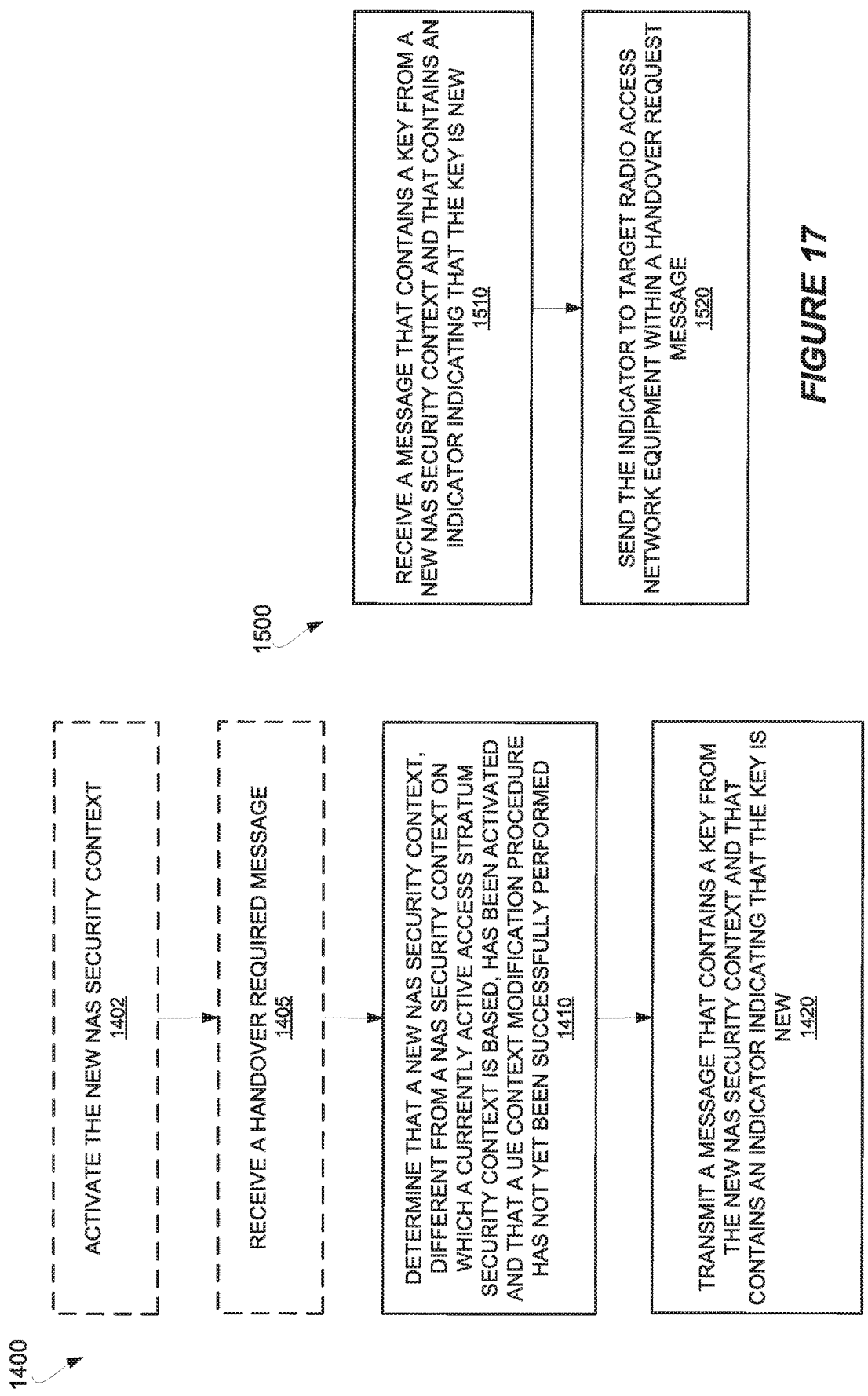

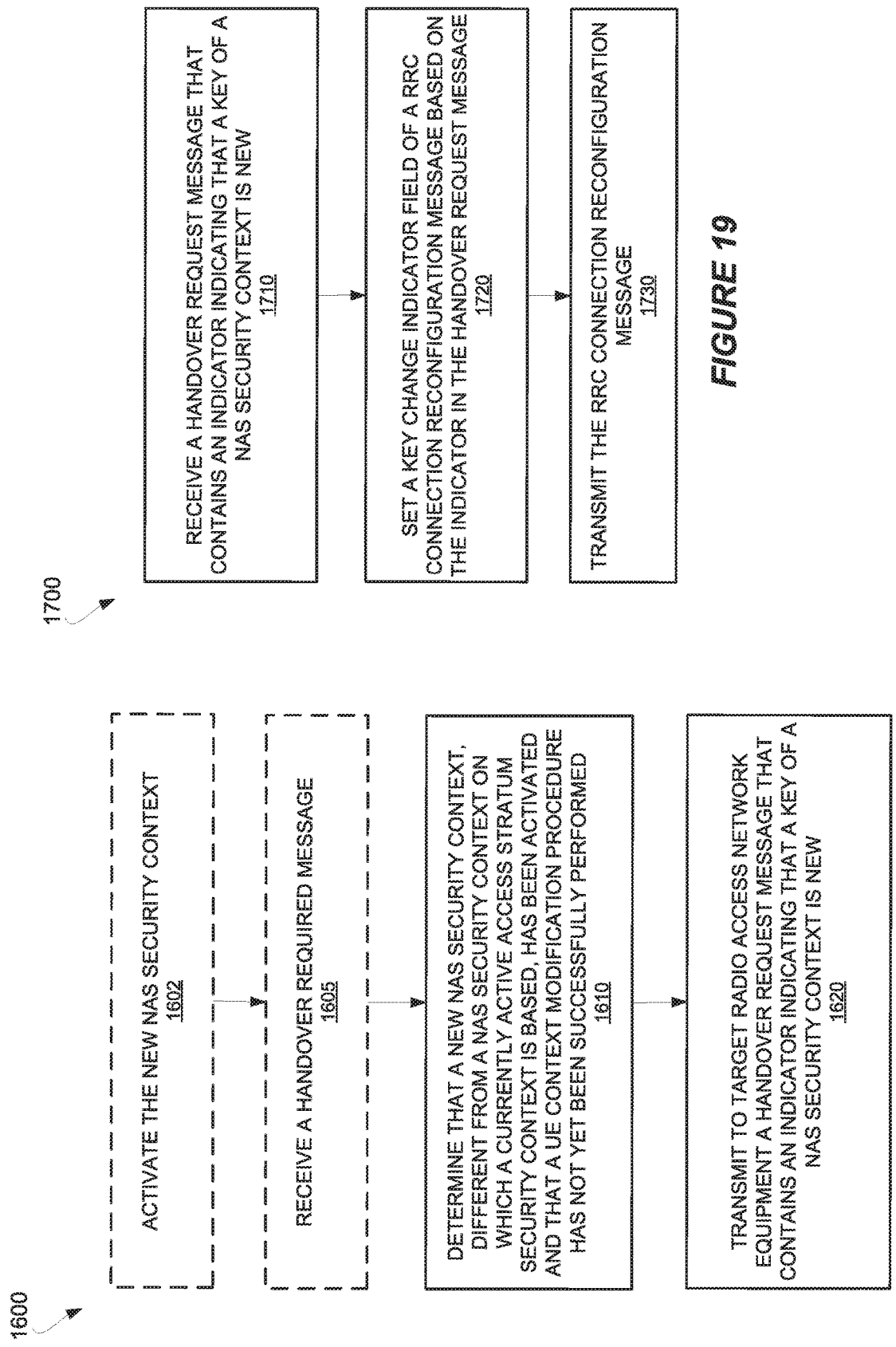

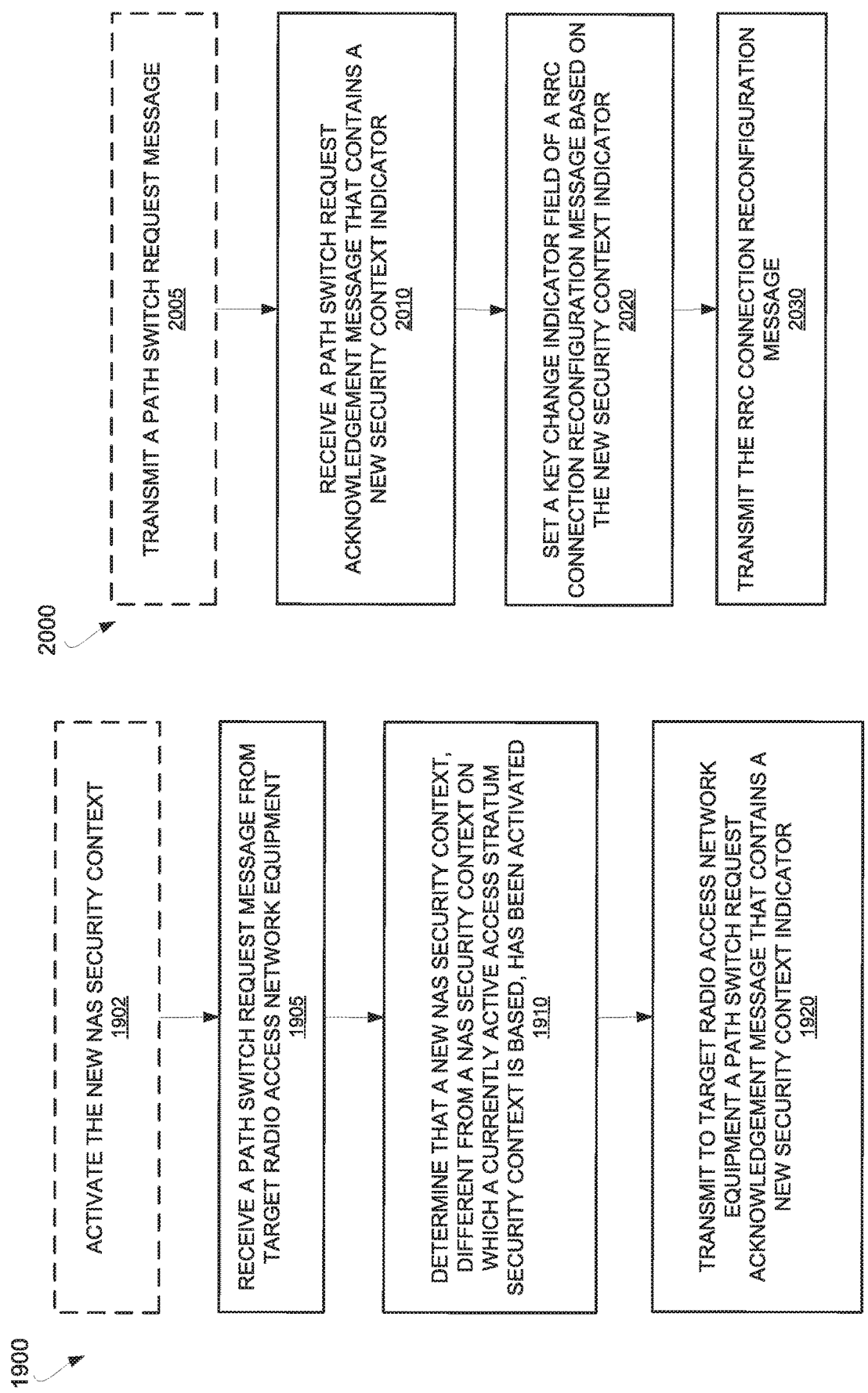

SECURITY CONTEXT IN A WIRELESS COMMUNICATION SYSTEM

BACKGROUND

A user equipment in a wireless communication system establishes a so-called access stratum (AS) security context with a radio access network (RAN) in the system and a so-called non-access stratum (NAS) Security context with a core network (CN) of the system. The AS security context (including AS security key(s) therein) is used for confidentiality and/or integrity protection of AS messages, whereas the NAS security context (including NAS security key(s) therein) is used for confidentiality and/or integrity protection of NAS messages. Because the AS security context is based on (e.g., derived from) the NAS security context, complications arise when the NAS security context changes, especially when race conditions develop between procedures for modifying the AS security context and procedures for handing over the user equipment.

SUMMARY

Some embodiments herein leverage signalling from core network equipment during or in association with (e.g., responsive to) a handover procedure for handover of a user equipment. This signalling in some embodiments ultimately enables radio access network equipment in the RAN (e.g., the target radio access network equipment of the handover) and the user equipment to determine whether any new NAS security context is to be used as a basis for an AS security context between the user equipment and that radio access network equipment. With the signalling occurring during or in associated with the handover procedure, an explicit (dedicated) security context modification procedure may be unnecessary. This may prove advantageous by ultimately reducing control signalling, reducing handovers, and simplifying state management.

More particularly, some embodiments herein include a method performed by core network equipment configured for use in a core network of a wireless communication system. The method in some embodiments comprises switching to using a new non-access stratum, NAS, security context between a user equipment and the core network equipment. The method in some embodiments further comprises, during or in association with a handover procedure for handover of the user equipment, signaling from the core network equipment that the new NAS security context between the user equipment and the core network equipment is to be used as a basis for an access stratum (AS) security context between the user equipment and radio access network equipment. In some embodiments, for instance, the signaling takes the form of a new security context indicator, NSCI, or a key change indicator.

In some embodiments, the method further comprises performing said signaling responsive to determining that the new NAS security context has been activated, that the new NAS security context is different from a NAS security context on which a currently active AS security context is based, and that the core network equipment has not yet performed an explicit security context modification procedure that prompts the radio access network equipment and the user equipment to switch to using a new AS security context based on the new NAS security context.

In some embodiments, the handover procedure is for handover of the user equipment to target radio access network equipment. In one such embodiment, the method further comprises receiving a path switch request from the target radio access network equipment after the handover procedure. In this case, the signaling may comprise, after the handover procedure, transmitting a path switch request acknowledgement message to the target radio access network equipment responsive to the path switch request. The path switch request acknowledgement message may include a field indicating that the new NAS security context is to be used as a basis for the AS security context. For example, the field may be a new security context indicator field.

In some embodiments, the handover procedure is for handover of the user equipment from source radio access network equipment to target radio access network equipment and the core network equipment comprises source core network equipment associated with the source radio access network equipment. In one such embodiment, the signaling comprises, during the handover procedure and responsive to receiving a handover required message from the source radio access network equipment, transmitting a forward relocation request message from the core network equipment to target core network equipment associated with the target access radio access network equipment. The forward relocation request message may include a field indicating that the new NAS security context is to be used as a basis for the AS security context. For example, the field may be a key change indictor field that indicates a NAS security context key has changed.

In some embodiments, the handover procedure is for handover of the user equipment from source radio access network equipment to target radio access network equipment. In one such embodiment, the signaling comprises, during the handover procedure, transmitting a handover request message from the core network equipment to the target radio access network equipment. The handover request message may include a field that indicates that the new NAS security context is to be used as a basis for the AS security context. For example, the field may be a key change indictor field that indicates a NAS security context key has changed.

In some embodiments, the core network equipment implements an access and mobility management function, AMF, in a core network.

Other embodiments herein include a method performed by equipment configured for use in a wireless communication system. The method in some embodiments comprises, during or in association with a handover procedure for handover of a user equipment, receiving signaling from core network equipment indicating that a new non-access stratum (NAS) security context between the user equipment and the core network equipment is to be used as a basis for an access stratum (AS) security context between the user equipment and radio access network equipment.

In some embodiments, the method further comprises determining, based on the signaling, a NAS security context to use as a basis for the AS security context and using the AS security context as based on the determined NAS security context.

In some embodiments, the method further comprises, based on the signaling from the core network equipment, signaling towards the user equipment that the NAS security context on which the AS security context is based has changed or that the new NAS security context between the user equipment and the core network equipment is to be used as the basis for the AS security context. In one such embodiment, for example, the signaling towards the user equipment is performed by transmitting a key change indicator to the user equipment in a radio resource control, RRC, connection reconfiguration message.

In some embodiments, the handover procedure is for handover of the user equipment to target radio access network equipment and said equipment is the target radio access network equipment. In one such embodiment, receiving the signaling comprises, after the handover procedure, receiving from the core network equipment a path switch request acknowledgement message including a field indicating that the new NAS security context is to be used as a basis for the AS security context. For example, the field may be a new security context indicator field.

In some embodiments, the handover procedure is for handover of the user equipment from source radio access network equipment to target radio access network equipment, the core network equipment comprises source core network equipment associated with the source radio access network equipment, and said equipment is target core network equipment associated with the target access radio access network equipment. In one such embodiment, receiving the signaling comprises, during the handover procedure, receiving from the source core network equipment a forward relocation request message including a field indicating that the new NAS security context is to be used as a basis for the AS security context.

In some embodiments, the handover procedure is for handover of the user equipment from source radio access network equipment to target radio access network equipment, and said equipment is the target radio access network equipment. In one such embodiment, receiving the signaling comprises, during the handover procedure, receiving from the core network equipment a handover request message including a field that indicates that the new NAS security context is to be used as a basis for the AS security context. For example, the field may be a key change indictor field that indicates a NAS security context key has changed.

In some embodiments, the core network equipment implements an access and mobility management function, AMF, in a core network.

Embodiments also include corresponding apparatus, computer programs, and carriers. For example, embodiments include core network equipment configured for use in a core network of a wireless communication system. The core network equipment is configured (e.g., via processing circuitry and memory of the core network equipment) to switch to using a new non-access stratum, NAS, security context between a user equipment and the core network equipment; and during or in association with a handover procedure for handover of the user equipment, signal from the core network equipment that the new NAS security context between the user equipment and the core network equipment is to be used as a basis for an access stratum AS security context between the user equipment and radio access network equipment.

Embodiments also include equipment (e.g., core network equipment, radio access network equipment, or user equipment) configured for use in a wireless communication system. The equipment is configured (e.g., via processing circuitry and memory of the equipment) to, during or in association with a handover procedure for handover of a user equipment, receive signaling from core network equipment indicating that a new non-access stratum (NAS) security context between the user equipment and the core network equipment is to be used as a basis for an access stratum (AS) security context between the user equipment and radio access network equipment.

BRIEF DESCRIPTION OF THE DRAWINGS

FIG. 2 is a logic flow diagram of a method performed by core network equipment according to some embodiments.

FIG. 3 is a logic flow diagram of a method performed by equipment according to some embodiments.

FIG. 16 is a logic flow diagram of a method performed by core network equipment or equipment implementing an AMF according to some embodiments.

FIG. 17 is a logic flow diagram of a method performed by a target AMF according to some embodiments.

FIG. 18 is a logic flow diagram of a method performed by core network equipment or equipment implementing an AMF according to other embodiments.

FIG. 19 is a logic flow diagram of a method performed by radio access network equipment according to some embodiments.

FIG. 21 is a logic flow diagram of a method performed by core network equipment or equipment implementing an AMF according to still other embodiments.

FIG. 22 is a logic flow diagram of a method performed by radio access network equipment according to other embodiments.

DETAILED DESCRIPTION

Figure 1:
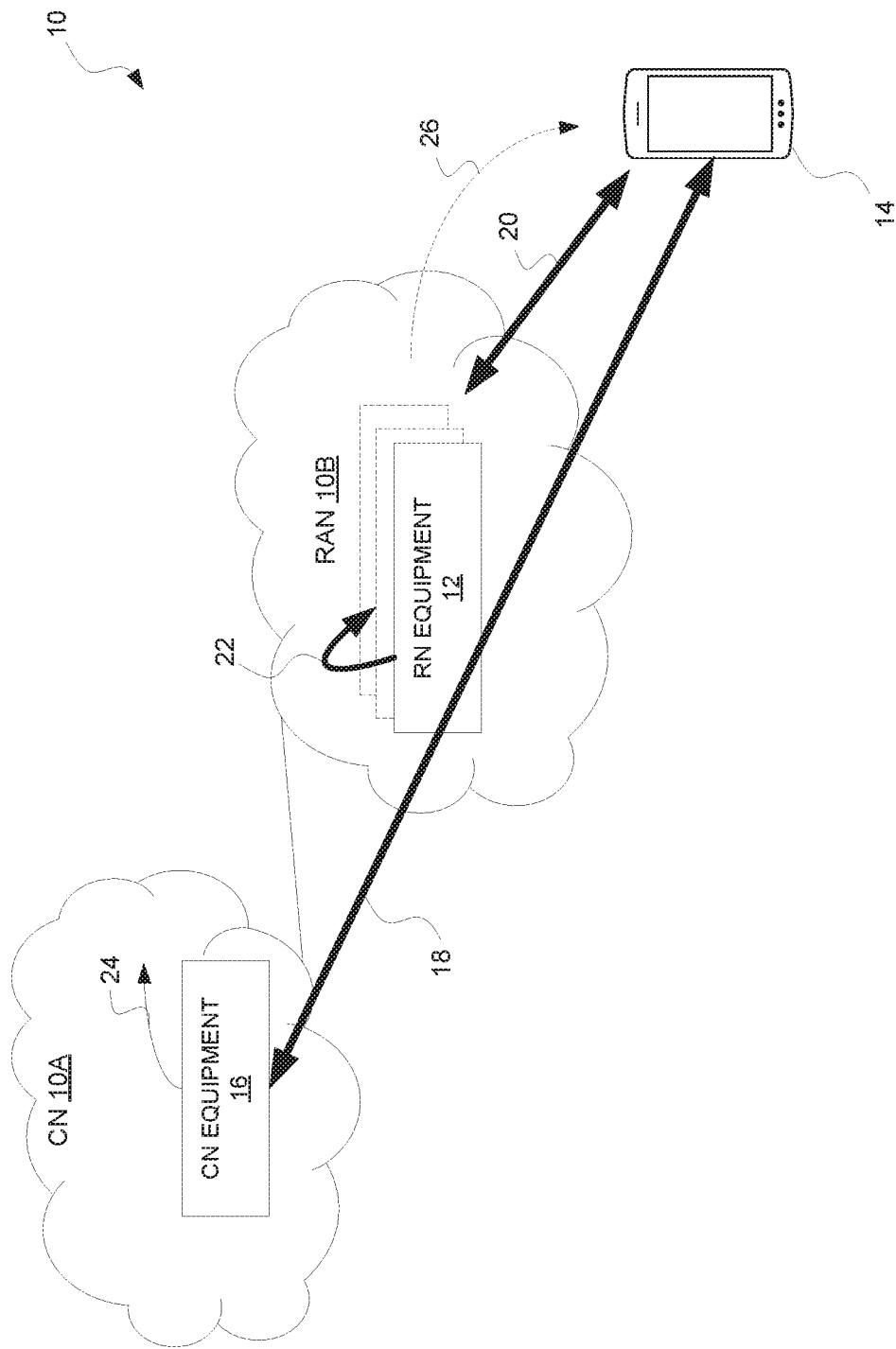
FIG. 1 is a block diagram of a wireless communication system according to some embodiments.

FIG. 1 shows a wireless communication system 10 (e.g., a 5G system) according to some embodiments. The system 10 includes a core network (CN) 10A and a radio access network (RAN) 10B. The RAN 10B includes one or more radio access network equipment 12 (e.g., one or more base stations) for providing radio access (e.g., via one or more cells) to user equipment, one of which is shown as user equipment 14. Via this radio access, the user equipment 14 connects to core network equipment 16 (e.g., implementing an access and mobility function, AMF, in a 5G core network) in the CN 10A, which in turn may provide the user equipment 14 with access to one or more external networks, such as the Internet.

The user equipment 14 and core network equipment 16 establish a state of security between themselves referred to as a non-access stratum (NAS) security context 18. The NAS security context 18 may include for instance a NAS security key, a security key identifier, security capabilities, counters, etc. The user equipment 14 and core network equipment 16 use the NAS security context 18 to provide confidentiality and/or integrity protection for NAS messages that the user equipment 14 and core network equipment 16 exchange. Similarly, the user equipment 14 and radio access network equipment 12 establish a state of security between themselves referred to as an access stratum (AS) security context 20. The AS security context may include for instance an AS security key, a security key identifier, security capabilities, counters, etc. The user equipment 14 and radio access network equipment 12 use the AS security context 20 to provide confidentiality and/or integrity protection for AS messages that the user equipment 14 and radio access network equipment 12 exchange.

An AS security context is based on a NAS security context according to some embodiments. For example, the base key of an AS security context (e.g., K_gNB in 5G) may be derived from or otherwise based on a base key of a NAS security context (e.g., K_AMF in 5G), such that in general the AS security context is derived from or otherwise based on the NAS security context. Accordingly, if the core network equipment 16 and the user equipment 14 switch from using one NAS security context to a new NAS security context (e.g., with a new base key), the radio access network equipment 12 and the user equipment 14 are to themselves switch from using an AS security context that is based on the old NAS security context to using a new AS security context that is based on the new NAS security context. The core network equipment 16 may perform an explicit (dedicated) security context modification procedure towards the radio access network equipment 12 for this purpose, i.e., to prompt the radio access network equipment 12 and user equipment 14 to (synchronously) switch to a new AS security context that is based on the new NAS security context. However, using an explicit security context modification procedure proves complicated and/or inefficient in some cases (e.g., due to control signalling race conditions), such as when security context modification is to be performed substantially concurrently with handover of the user equipment 14.

Accordingly, some embodiments herein leverage signalling 24 from the core network equipment 16 during or in association with (e.g., responsive to) a handover procedure for handover 22 of the user equipment 14. This signalling 24 in some embodiments ultimately enables radio access network equipment in the RAN 10B (e.g., the target radio access network equipment of the handover 22) and the user equipment 14 to determine whether any new NAS security context is to be used as a basis for an AS security context between the user equipment 14 and that radio access network equipment. With the signalling 24 occurring during or in associated with the handover procedure, an explicit (dedicated) security context modification procedure may be unnecessary. This may prove advantageous by ultimately reducing control signalling, reducing handovers, and simplifying state management.

FIG. 2 illustrates processing performed by core network equipment 16 in this regard according to some embodiments. As shown, a method 100 performed by core network equipment 16 includes, during or in association with (e.g., responsive to) a handover procedure for handover 22 of the user equipment 14, (explicitly or implicitly) signaling 24 from the core network equipment 16 whether any new NAS security context between the user equipment 14 and the core network equipment 16 is to be used as a basis for an AS security context between the user equipment 14 and radio access network equipment (e.g., the target radio access network equipment of the handover 22) (Block 110). Where for example the core network equipment 16 has switched to using a new NAS security context (i.e., activated a new NAS security context so as to put a new NAS security context into use) (Block 105), the core network equipment 16 may signal that the new NAS security context is to be used as a basis for the AS security context. Otherwise, (e.g., if the core network equipment 16 has not switched to using a new NAS security context), the core network equipment 16 may signal that no new NAS security context is to be used as a basis for the AS security context (e.g., because no such new NAS security context exists).

The core network equipment 16 in some embodiments may only signal that a new NAS security context is to be used as a basis for the AS security context in this way if the core network equipment 16 has not already performed an explicit (dedicated) security context modification procedure, i.e., to prompt the radio access network equipment and the user equipment 14 to switch to using a new AS security context based on the new NAS security context. Indeed, if such an explicit context modification procedure has already been performed, the user equipment 14 and radio access network equipment need not be informed that a new NAS security context is to be used as a basis for the AS security context, since they will have already switched to using the new NAS security context for that purpose. Accordingly, as shown in FIG. 2, the method 100 in some embodiments may further include determining that a new NAS security context has been activated (i.e., put into use by the core network equipment 16 and the user equipment 14), that the new NAS security context is different from a NAS security context on which a currently active AS security context is based, and that an explicit security context modification procedure has not yet been performed (Block 107). The core network equipment 16 may accordingly signal that a new NAS security context is to be used as a basis for the AS security context (Block 110), responsive to making this determination.

The core network equipment 16 may perform the signaling in FIG. 2 to certain equipment. This equipment may be for instance the user equipment 14, radio access network equipment (e.g., target radio access network equipment of the handover 22), or core network equipment, e.g., depending on the conditions or circumstances (e.g., type of the handover 22). Regardless, FIG. 3 illustrates processing performed by such equipment according to some embodiments. As shown in FIG. 3, a method 200 performed by equipment configured for use in the system 10 includes, during or in association with (e.g., responsive to) a handover procedure for handover 22 of the user equipment 14, receiving (explicit or implicit) signaling 24 from the core network equipment 16 indicating whether any new NAS security context between the user equipment 14 and the core network equipment 16 is to be used as a basis for an AS security context between the user equipment 14 and radio access network equipment (e.g., the target radio access network equipment of the handover 22) (Block 210). As described above, where the core network equipment 16 has switched to using a new NAS security context, the signaling may indicate that a new NAS security context is to be used as a basis for the AS security context. Otherwise, (e.g., if the core network equipment 16 has not switched to using a new NAS security context), the signaling may indicate that no new NAS security context is to be used as a basis for the AS security context (e.g., because no such new NAS security context exists).

In some embodiments, such as in some cases where the equipment is the user equipment 14 itself that receives the signaling 22 from the core network equipment 16, the method 200 may further comprise determining, based on the signaling 22, a NAS security context to use as a basis for the AS security context (Block 220). Where for instance the user equipment 14 and the core network equipment 12 have switched from using an old NAS security context to using a new NAS security context, the signaling 26 enables the user equipment 14 to determine whether the old or the new NAS security context is to be used as a basis for the AS security context, e.g., in the handover procedure. In any event, the method 200 may further include using the AS security context as based on the determined NAS security context (Block 230). Using the AS security context may for instance involve using the AS security context for confidentiality and/or integrity protection of AS messages exchanged with radio access network equipment.

In other embodiments, such as in some cases where the equipment is radio access network equipment, the method by the equipment may alternatively or additionally comprise, based on the signaling 24 from the core network equipment, performing signaling 26 towards the user equipment 14 (Block 215). The signaling 26 as shown may for instance in turn signal whether any new NAS security context between the user equipment 14 and the core network equipment 16 is to be used as the basis for the AS security context. In this sense, then, the radio access network equipment effectively forwards or otherwise propagates the signaling 24 from the core network equipment to the user equipment 14 as signaling 26. The signaling 26 in other embodiments may be framed as signaling whether the NAS security context on which the AS security context is based has changed, e.g., to a new NAS security context that the user equipment 14 may have switched to. In either case, though, the signaling 26 towards the user equipment 14 may be realized in some embodiments by transmitting a key change indicator (keyChangeIndicator field) to the user equipment 14 in a radio resource control (RRC) connection reconfiguration message. Regardless, the signaling 26 to the user equipment 14 enables the user equipment 14 to determine a NAS security context to use as a basis for the AS security context, i.e., in the handover procedure as described above.

Figure 4:
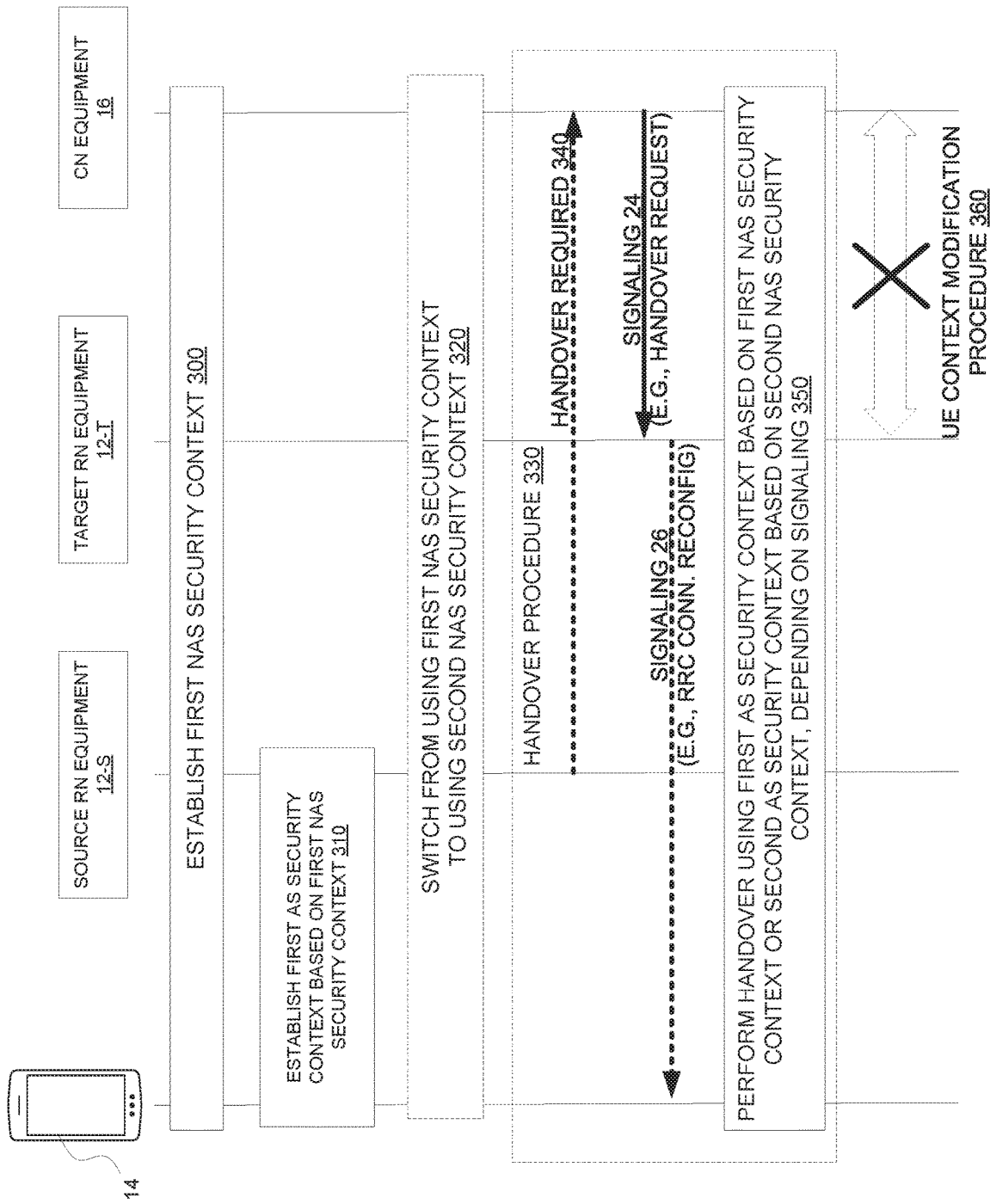
FIG. 4 is a sequence diagram for a handover directly facilitated by core network equipment according to some embodiments.

FIG. 4 illustrates one example of some embodiments above in a context where the handover 22 is a type in which the core network equipment 16 directly facilitates the handover (e.g., an N2-handover in 5G where no Xn interface exists between target and source radio access network equipment of the handover). As shown in FIG. 4, the user equipment 14 establishes a first NAS security context (e.g., including a first NAS base key) with the core network equipment 16 (Step 300). The user equipment 14 also establishes a first AS security context with (soon-to-be) source radio access network equipment 12-S based on the first NAS security context (Step 310). The first AS security context may for instance include a first AS base key that is derived from the first NAS base key. In any event, at a later time such as during an authentication procedure, the user equipment 14 and the core network equipment 16 may switch from using the first (now "old") NAS security context to using a second (new) NAS security context (Step 320). In this case, the second (new) NAS security context is different than the first NAS security context on which is based the first AS security context between the user equipment 14 and source radio access network equipment 12-S. In other words, as of Step 320 at least, the second (new) NAS security context as shown in FIG. 4 is a NAS security context that the user equipment 14 and the core network equipment 16 have switched to using, but a (second) AS security context based on that second (new) NAS security context has not been put into us, e.g., via an explicit (dedicated) UE context modification procedure. As shown in FIG. 4, such may still be the case when a handover procedure 330 is initiated for handover of the user equipment 14 from the source radio access network equipment 12-S to target radio access network equipment 12-T. For example, when the core network equipment 16 receives a handover required message (Step 340), the core network equipment 16 may still not have initiated an explicit (dedicated) UE context modification procedure in order to put into use a second (new) AS security context based on the second (new) NAS security context.

Notably, the core network equipment 16 performs signaling 24 during the handover procedure 330 in order to signal to the target radio access network equipment 12-T whether any new NAS security context between the user equipment 14 and the core network equipment 16 is to be used as a basis for an AS security context between the user equipment 14 and the target radio access network equipment 12-T. The signaling 24 may for instance be included (e.g., as a boolean field) in a handover request message sent to the target radio access network equipment 12-T. In some embodiments, the target radio access network equipment 12-T, based on this signaling 24 from the core network equipment 16, in turns performs signaling 26 towards the user equipment 14. The signaling 26 may indicate for instance whether the NAS security context on which the AS security context is based has changed or whether any new NAS security context between the user equipment 14 and the core network equipment 16 is to be used as the basis for the AS security context.

The signaling 26 may be included for example as a key change indicator in an RRC connection reconfiguration message. In any event, based on this signaling 26, the user equipment 14 may determine whether to use the first AS security context (based on the first NAS security context) in the handover procedure 330 or to use a second AS security context (based on the second (new) NAS security context) in the handover procedure 330. Advantageously, no explicit (dedicated) UE context modification procedure (360) need be performed in this case.

Figure 5:
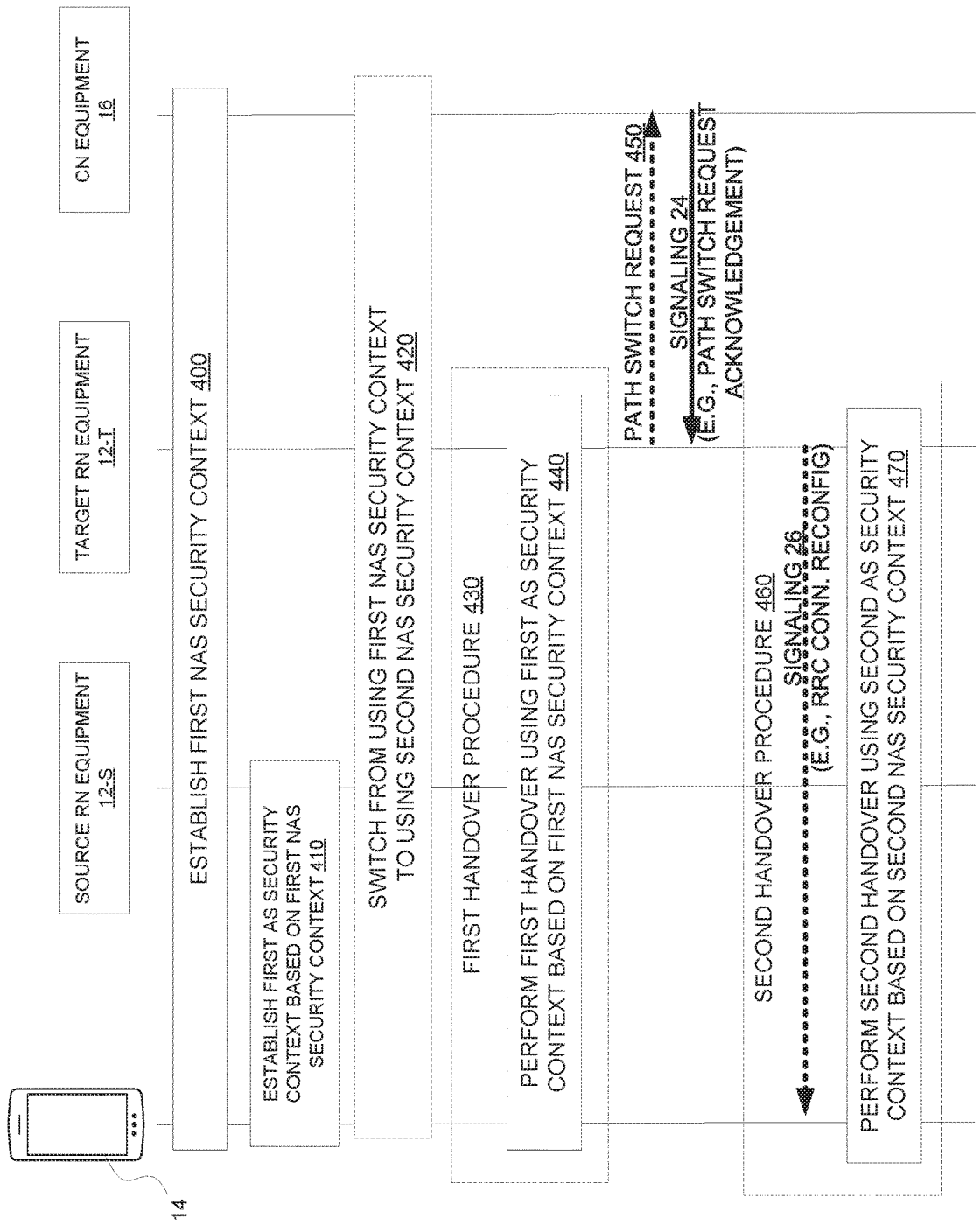
FIG. 5 is a sequence diagram for a handover that is not directly facilitated by core network equipment according to some embodiments.

FIG. 5 illustrates another example of some embodiments in a context where the handover 22 is a type in which the core network equipment 16 does not directly facilitate the handover (e.g., an Xn-handover in 5G where an Xn interface exists between target and source radio access network equipment of the handover). As shown in FIG. 5, the user equipment 14 establishes a first NAS security context (e.g., including a first NAS base key) with the core network equipment 16 (Step 400). The user equipment 14 also establishes a first AS security context with (soon-to-be) source radio access network equipment 12-S based on the first NAS security context (Step 410). The first AS security context may for instance include a first AS base key that is derived from the first NAS base key. In any event, at a later time such as during an authentication procedure, the user equipment 14 and the core network equipment 16 may switch from using the first (now "old") NAS security context to using a second (new) NAS security context (Step 420). In this case, the second (new) NAS security context is different than the first NAS security context on which is based the first AS security context between the user equipment 14 and source radio access network equipment 12-S. In other words, as of Step 420 at least, the second (new) NAS security context as shown in FIG. 5 is a NAS security context that the user equipment 14 and the core network equipment 16 have switched to using, but a (second) AS security context based on that second (new) NAS security context has not been put into us, e.g., via an explicit (dedicated) UE context modification procedure. As shown in FIG. 5, such may still be the case when a first handover procedure 430 is initiated for handover of the user equipment 14 from the source radio access network equipment 12-S to target radio access network equipment 12-T, without direct involvement of the core network equipment 16. In fact, in these embodiments the first handover procedure 430 is performed using the first AS security context based on the first NAS security context, even though the user equipment 14 and the core network equipment 16 have already switched to using the second (new) NAS security context.

Notably, though, the core network equipment 16 performs signaling 24 in association with (e.g., responsive to) the handover procedure 430 in order to signal to the target radio access network equipment 12-T whether any new NAS security context between the user equipment 14 and the core network equipment 16 is to be used as a basis for an AS security context between the user equipment 14 and the target radio access network equipment 12-T (or a different radio access network equipment to which the user equipment may be handed over to). As shown, for instance, the core network equipment 16 may perform the signaling 24 responsive to receiving a path switch request 450 from the target radio access network equipment 12-T in association with the first handover procedure 430. The signaling 24 may for instance be included (e.g., as a boolean field) in a path switch request acknowledgement message sent to the target radio access network equipment 12-T. In some embodiments, the target radio access network equipment 12-T, based on this signaling 24 from the core network equipment 16, in turns performs signaling 26 towards the user equipment 14, e.g., during or in association with a second handover procedure 460 which may be an intra-cell handover or an inter radio access network equipment (e.g., Xn) handover. The signaling 26 may in any event indicate whether the NAS security context on which the AS security context is based has changed or whether any new NAS security context between the user equipment 14 and the core network equipment 16 is to be used as the basis for the AS security context. The signaling 26 may be included for example as a key change indicator in an RRC connection reconfiguration message during the second handover procedure 460. In any event, based on this signaling 26, the user equipment 14 may determine whether to use the first AS security context (based on the first NAS security context) in the second handover procedure 430 or to use a second AS security context (based on the second (new) NAS security context) in the handover procedure 430. As shown, for example, the user equipment 14 and target radio access network equipment 12-T perform an intra-cell handover as the second handover using the second AS security context (based on the second (new) NAS security context (Step 470). Advantageously, no explicit (dedicated) UE context modification procedure need be performed in this case.

Note that the core network equipment 16 which performs the signalling 24 herein may be a source core network equipment or a target core network equipment where the handover 22 involves a change in core network equipment. In embodiments wherein the core network equipment 16 is the target core network equipment, the signalling 24 may be to the user equipment 14 and/or radio access network equipment (e.g., target radio access network equipment of the handover 22). In embodiments wherein the core network equipment 16 is the source core network equipment, the signalling 24 may be to the target core network equipment of the handover 22, e.g., whereby the target core network equipment may in turn perform similar signalling so as to propagate to the user equipment 14 and/or radio access network equipment.

Note also that the signalling 24 shown in FIG. 1 may be implemented in any number of ways. In some embodiments, for instance, the signalling 24 may indicate whether any new NAS security context is to be used by indicating whether the NAS security context 18 has changed (e.g., by indicating that the NAS security context has changed or that the NAS security context has not changed). The signalling 24 in one such embodiment may indicate that the NAS security context 18 has changed to be different than a NAS security context on which an AS security context between the user equipment 14 and the source radio access network equipment is based (i.e., the currently active AS security context). The signalling 24 in another such embodiment may indicate whether or not the NAS security context, on which the AS security context is to be based, has changed. In still other embodiments, the signalling 24 may effectively indicate which NAS security context (old or new) is to be used as a basis for the AS security context. In yet other embodiments, the signalling 24 may signal whether any new NAS security key is to be used as a basis for an AS security key in the handover procedure.

Note further that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Core network equipment as described above may implement an access and mobility function (AMF) at least in some embodiments. Regardless, core network equipment may perform any of the processing herein by implementing any functional means or units. In one embodiment, for example, core network equipment comprises respective circuits or circuitry configured to perform any of the steps shown in any of FIGS. 2-5. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 6A:
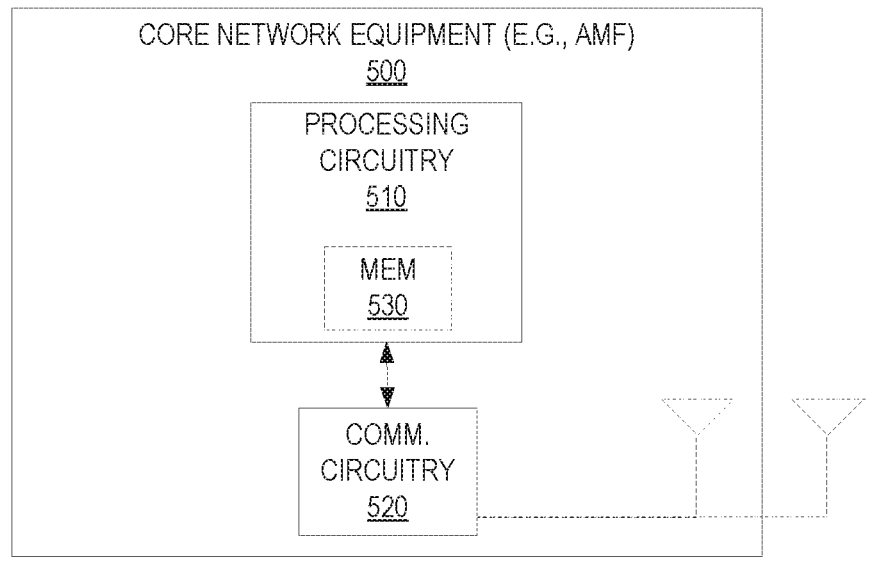
FIG. 6A is a block diagram of core network equipment according to some embodiments.

FIG. 6A illustrates core network equipment 500 in accordance with one or more embodiments. The core network equipment 500 may correspond for instance to core network equipment 16 discussed herein as performing signaling 24, or any other core network equipment (e.g., target core network equipment) that may receiving such signaling 24.

Regardless, as shown, the core network equipment 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, e.g., in any of FIGS. 2-5, such as by executing instructions stored in memory 530. The processing circuitry 510 in this regard may implement certain functional means, units, or modules.

Figure 6B:
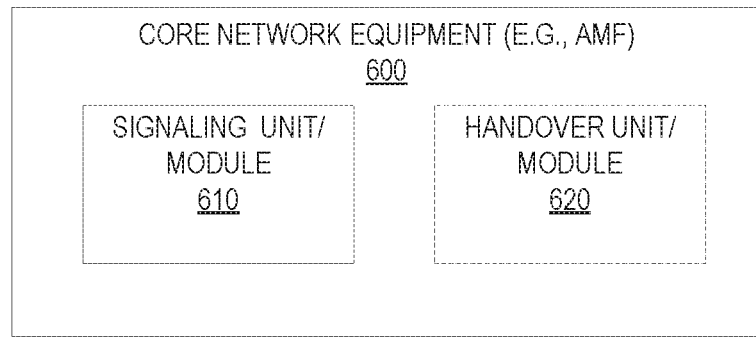
FIG. 6B is a block diagram of core network equipment according to other embodiments.

FIG. 6B illustrates core network equipment 600 implemented in accordance with one or more other embodiments. The core network equipment 600 may correspond for instance to core network equipment 16 discussed herein as performing signaling 24, or any other core network equipment (e.g., target core network equipment) that may receiving such signaling 24. Regardless, as shown, the core network equipment 600 implements various functional means, units, or modules, e.g., via the processing circuitry 510 in FIG. 6A and/or via software code. These functional means, units, or modules, e.g., for implementing any of the steps in any of FIGS. 2-5, include for instance a signaling unit or module 610. In some embodiments, the signaling unit or module 610 is for, during or in association with a handover procedure for handover of a user equipment 14, signaling from the core network equipment 600 whether any new non-access stratum (NAS) security context between the user equipment and the core network equipment 600 is to be used as a basis for an access stratum (AS) security context between the user equipment 14 and radio access network equipment. In other embodiments, though, the signaling unit or module 610 may be for, during or in association with a handover procedure for handover of a user equipment 14, receiving signaling from (other) core network equipment indicating whether any new non-access stratum (NAS) security context between the user equipment 14 and the (other) core network equipment is to be used as a basis for an access stratum (AS) security context between the user equipment 14 and radio access network equipment. Regardless, also included may be a handover unit or module 610 for performing some aspects of the handover procedure.

Figure 7A:
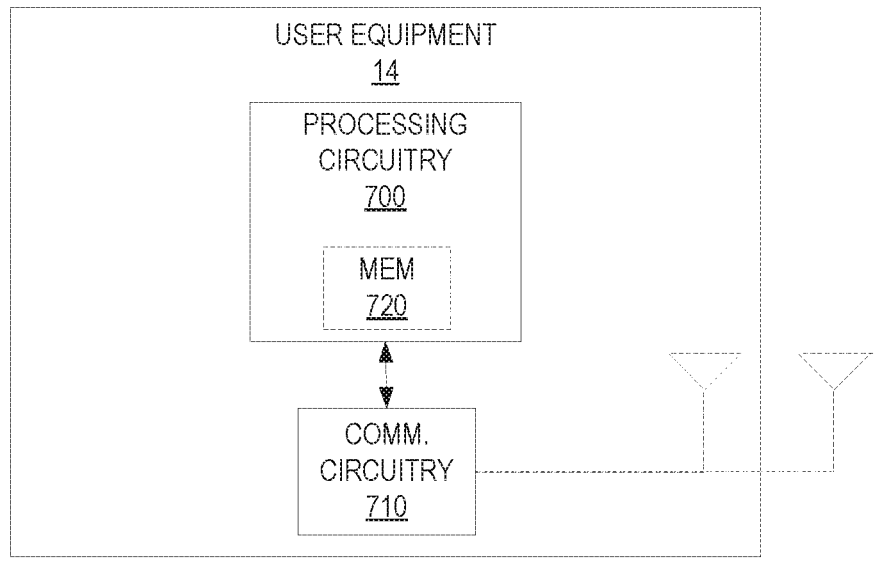
FIG. 7A is a block diagram of a user equipment according to some embodiments.

FIG. 7A illustrates a user equipment 14 as implemented in accordance with one or more embodiments. As shown, the user equipment 14 includes processing circuitry 700 and communication circuitry 710. The communication circuitry 710 (e.g., radio circuitry) is configured to transmit and/or receive information to and/or from one or more other nodes, e.g., via any communication technology. Such communication may occur via one or more antennas that are either internal or external to the user equipment 14. The processing circuitry 700 is configured to perform processing described above, such as by executing instructions stored in memory 720. The processing circuitry 700 in this regard may implement certain functional means, units, or modules.

Figure 7B:
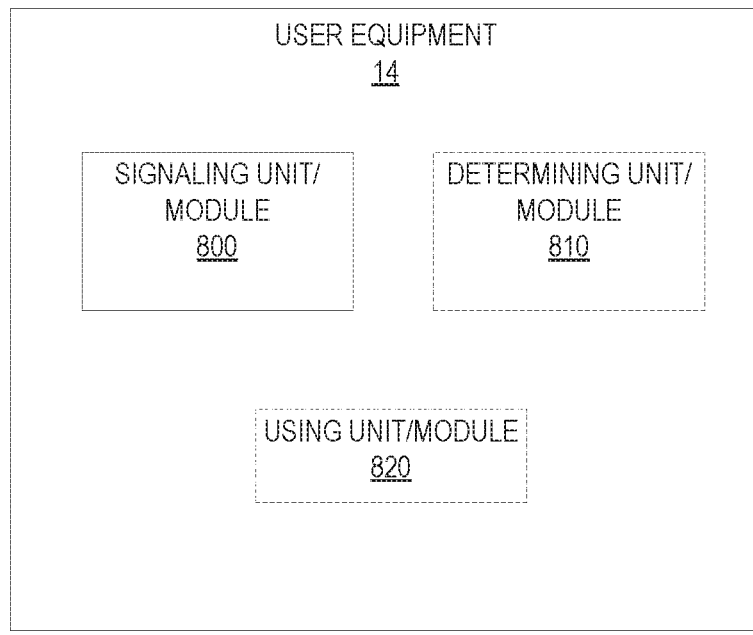
FIG. 7B is a block diagram of a user equipment according to other embodiments.

FIG. 7B illustrates a schematic block diagram of user equipment 14 in a wireless network according to still other embodiments. As shown, the user equipment 14 implements various functional means, units, or modules, e.g., via the processing circuitry 700 in FIG. 7A and/or via software code. These functional means, units, or modules, e.g., for implementing the method(s) herein, include for instance a signalling unit or module 800 for receiving signalling 24 described above, i.e., for during or in association with a handover procedure for handover of a user equipment, receiving signaling from core network equipment 16 indicating whether any new non-access stratum (NAS) security context between the user equipment 14 and the core network equipment 16 is to be used as a basis for an access stratum (AS) security context between the user equipment 14 and radio access network equipment. Also included may be a determining unit or module 810 for determining, based on the signaling, a NAS security context to use as a basis for the AS security context, and a using unit or module 820 for using the AS security context as based on the determined NAS security context.

Similarly, radio access network equipment as described above may perform any of the processing herein by implementing any functional means or units. In one embodiment, for example, the radio access network equipment comprises respective circuits or circuitry configured to perform any of the steps shown in any of FIGS. 3-5. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 8A:
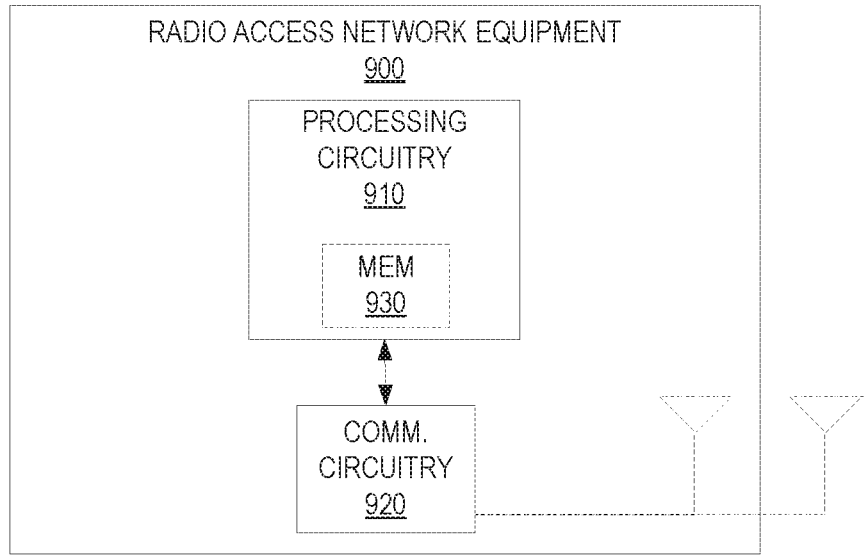
FIG. 8A is a block diagram of radio access network equipment according to some embodiments.

FIG. 8A illustrates radio access network equipment 900 in accordance with one or more embodiments. The radio access network equipment 900 may correspond to any of the radio access network equipment discussed above (e.g., target radio access network equipment 12-T). As shown, the radio access network equipment 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above, e.g., in FIG. 4, such as by executing instructions stored in memory 930. The processing circuitry 910 in this regard may implement certain functional means, units, or modules.

Figure 8B:
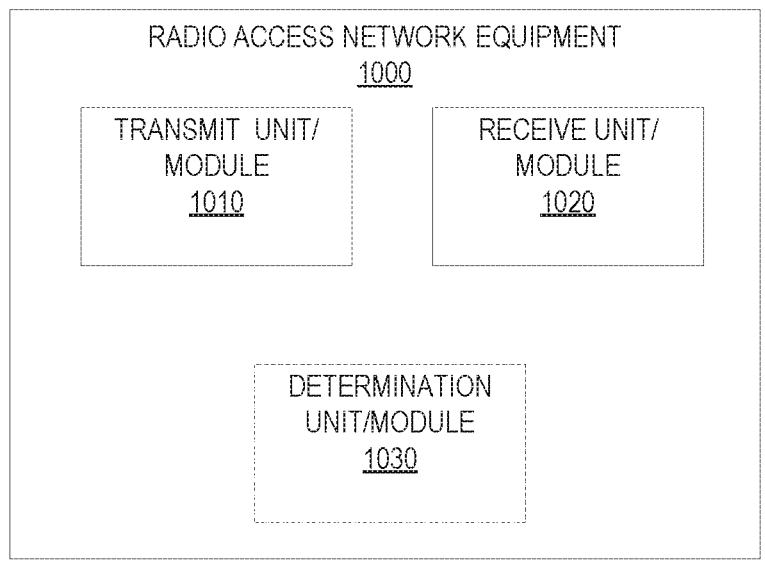
FIG. 8B is a block diagram of radio access network equipment according to other embodiments.

FIG. 8B illustrates a radio access network equipment 1000 implemented in accordance with one or more other embodiments. The radio access network equipment 900 may correspond to any of the radio access network equipment discussed above (e.g., target radio access network equipment 12-T). As shown, the radio access network equipment 1000 implements various functional means, units, or modules, e.g., via the processing circuitry 910 in FIG. 8A and/or via software code. These functional means, units, or modules, e.g., for implementing any of the steps in any of FIGS. 3-5, include for instance a signalling unit or module 1010 for receiving signalling 24 described above, i.e., for during or in association with a handover procedure for handover of a user equipment, receiving signaling from core network equipment 16 indicating whether any new non-access stratum (NAS) security context between the user equipment 14 and the core network equipment 16 is to be used as a basis for an access stratum (AS) security context between the user equipment 14 and radio access network equipment. Also included may be a determining unit or module 1020 for determining, based on the signaling, a NAS security context to use as a basis for the AS security context, and a using unit or module 1030 for using the AS security context as based on the determined NAS security context.

Those skilled in the art will also appreciate that embodiments herein further include corresponding computer programs.

A computer program comprises instructions which, when executed on at least one processor of equipment configured for use in a wireless communication system, cause the equipment carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a radio access network equipment 12 or user equipment 14, cause the radio access network equipment 12 or user equipment 14 to perform as described above.

Embodiments further include a computer program product comprising program code portions for performing the steps of any of the embodiments herein when the computer program product is executed by a radio access network equipment 12 or user equipment 14. This computer program product may be stored on a computer readable recording medium.

Additional embodiments will now be described. At least some of these embodiments may be described as applicable in certain contexts and/or wireless network types (e.g., 5G) for illustrative purposes, but the embodiments are similarly applicable in other contexts and/or wireless network types not explicitly described. Accordingly, the embodiments below may be particular examples of and/or otherwise combinable with the embodiments above.

Figure 9:
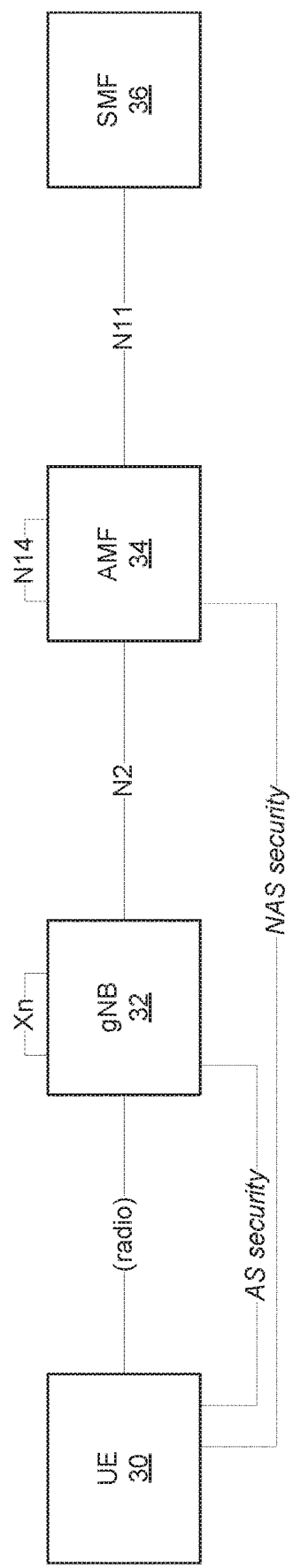
FIG. 9 is a block diagram of a 5G network according to some embodiments.

Consider now a brief overview of a 5G network and its security. he 3GPP TS 23.501 describes the 5G network architecture. A stripped-down simplified version of the 5G network is shown in FIG. 9.

The UE (User Equipment) 30 is a mobile device used by the user to wirelessly access the network. The UE 30 may correspond to the user equipment 14 in FIG. 1. The radio access network function or base station called gNB (Next Generation Node B) 32 is responsible for providing wireless radio communication to the UE 30 and connecting the UE 30 to the core network. The gNB 32 may correspond to radio access network equipment 12 in FIG. 1. The core network function called AMF (Access and Mobility Management Function) 34 is responsible for handling the mobility of the UE 30, among other responsibilities. The AMF 34 may correspond to CN equipment 16 in FIG. 1. Another core network function called SMF (Session Management Function) 36 is responsible for handling the session and traffic steering of the UE 30, among other responsibilities.

The UE 30 interacts with the gNB 32 over-the-air using radio interface. The gNB 32 in turn interacts with the AMF 34 using the interface called the N2. The interface between the AMF 34 and the SMF 36 is called the N11. The gNBs interact with each other using the Xn interface. Similarly, the AMFs interact with each other using the N14 interface.

The logical aspects between the UE 30 and the AMF 34 is referred to as NAS (non-access stratum) and that between the UE 30 and the gNB 32 is referred to as AS (access stratum). Correspondingly, the security of communication (control plane and user plane, if applicable) are referred to as NAS security and AS security, respectively.

When a state of security is established between the UE 30 and the AMF 34, both of them store the relevant security data, e.g., NAS security key, security key identifier, security capabilities, various counters, etc. Such a state of security between the UE 30 and the AMF 34 including the security data is referred to as NAS security context. Similarly, the AS security context refers to the state of security including security data between the UE 30 and the gNB 32.

The base key on which the NAS security context is based is called K_AMF. From this K_AMF, further key derivations result in other keys that are used to provide confidentiality and integrity protection of NAS messages (mostly control plane). The K_AMF is also used to derive another base key on which the AS security context is based on, called the K_gNB. From this K_gNB, further key derivations result in other keys that are used to provide confidentiality and integrity protection of AS messages (both control plane and user plane).

Consider next synchronization between NAS and AS security contexts. As described earlier, the security for the UE's traffic is built around two security states called the NAS security context and the AS security context. The NAS security context is shared between the UE 30 and the AMF 34, and the AS security context is shared between the UE 30 and the gNB 32. The K_AMF is the base key for the NAS security context and the K_gNB is the base key for the AS security context. Since, the K_gNB is derived from the K_AMF, it is said in general that the AS security context is derived from the NAS security context. Note that the term base key does not imply that the key is at the root of the entire key hierarchy when the hierarchy is viewed as a tree.

Rather the term indicates that the key is the base (or root) for a sub-tree in the total key hierarchy rooted in the key K which is the key specific to a particular subscription. On the user side, the key K is stored on the Universal Subscriber Identity Module (USIM), at least up to the LTE (Long Term Evolution) system.

During the course of time, the UE 30 and the AMF 34 may change the shared K_AMF from an old K_AMF to a new K_AMF, e.g., as a result of running an authentication procedure. After the K_AMF has changed, the security of the NAS traffic between the UE 30 and the AMF 34 can start using the new K_AMF. In other words, the new K_AMF becomes the active K_AMF.

However, since the AMF 34 and the gNB 32 are different network functions, the change in the K_AMF is not automatically known to the gNB 32, meaning that the K_gNB in the gNB 32 is still the one derived from the old K_AMF. It also means that security of the AS traffic between the UE 30 and the gNB 32 is based on the K_gNB derived from the old K_AMF. In other words, the active K_gNB is based on the old K_AMF. This is referred to as K_gNB being unsynchronized with the K_AMF, meaning that the active K_gNB is based on the old K_AMF.

Consequently, whenever K_AMF has changed, there is a need of an explicit UE Context Modification procedure 39 (shown in FIG. 10) initiated by the AMF 34 towards the gNB 32 and the UE 30 so that a new K_gNB is derived based on the active K_AMF. After the key change mechanism is completed, this is referred to as K_gNB being synchronized with the K_AMF, meaning that the active K_gNB is based on the active K_AMF.

The UE Context Modification procedure 39 belongs to the N2 interface and is specified in the 3GPP TS 38.413. Note that the 3GPP TS 38.413 uses the term "NG" instead of the "N2" and correspondingly, the protocol stack is referred as NGAP (Next Generation Application Protocol). The procedure is initiated by the AMF 34 in general to modify the established UE context. The modification could be related to security or other types of parameters (e.g., radio parameters). Therefore, including security data is optional in this message. The message sent by the AMF 34 is called the UE CONTEXT MODIFICATION REQUEST message 40. When the modification is related to security (i.e., to synchronize K_gNB with the K_AMF), the message 40 among other data includes the new K_gNB and the UE security capabilities.

Figure 10:
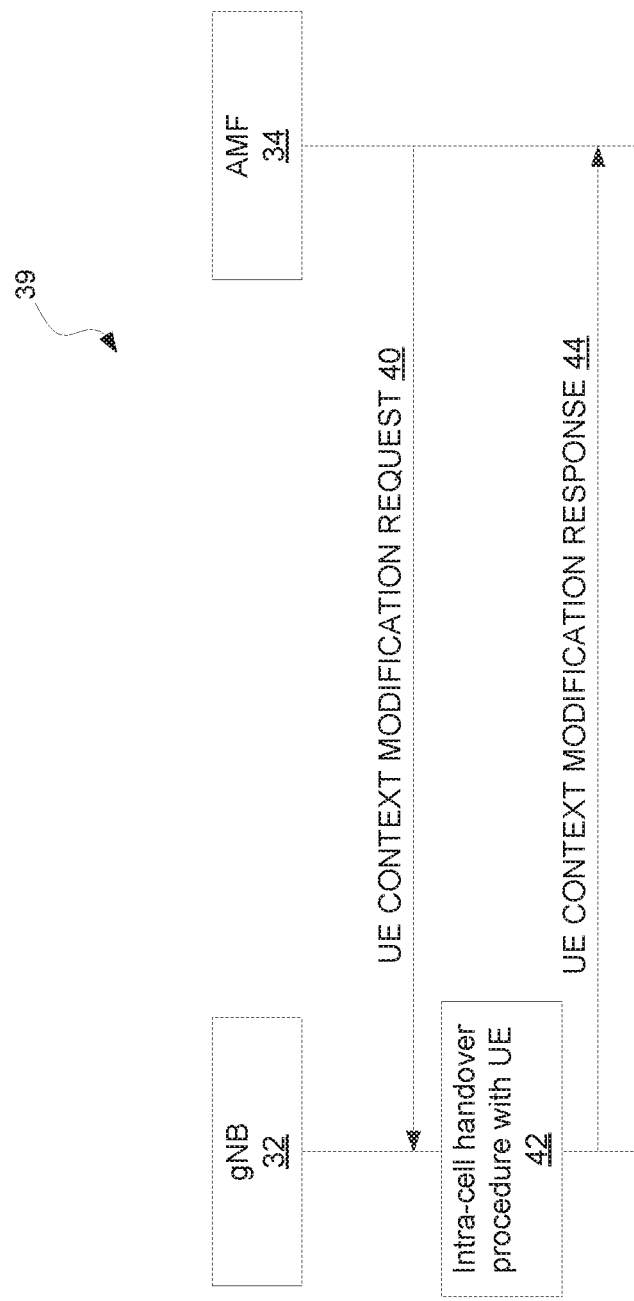
FIG. 10 is a sequence diagram of an explicit UE context modification procedure according to some embodiments.

As shown in FIG. 10, the gNB 32 performs an intra-cell handover procedure 42 with the UE 30 to change the active K_gNB, i.e., to bring the new K_gNB into use. The gNB 32 may thereafter send a UE context modification response 44 to confirm the performed UE context update.

Handover procedures in 5g will be briefly described next. The 3GPP specifications TS 23.502, TS 38.413, and TS 38.423 describe various aspects of the handover procedures in the 5G system. Mind that the 5G specification are works in progress and whenever the specification is missing some information, it will be assumed to work with similarity to the 4G or LTE (Long Term Evolution) system.

A smallest coverage area in which the gNB serves the UEs is called a cell. One gNB typically serves more than one cell. When the UE move from one cell to another cell while having active radio connection, i.e., while in RRC_CONNECTED mode, the source cell prepares and hands over the information related to the UE to the target cell so that the target cell can start serving the UE. This handing over mechanism is intuitively called a handover procedure. In other words, the handover procedure provides mobility support for UEs that are moving from one cell to another cell. In general, there are 3 types of handover as follows and illustrated in FIGS. 11A-11C.

Figure 11C:
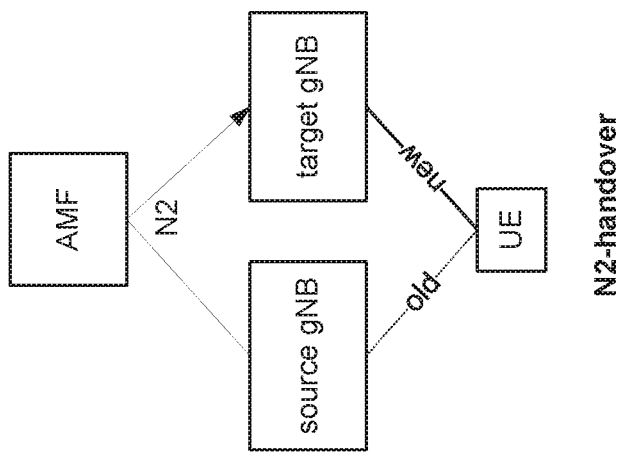
FIG. 11C is a block diagram of an N2 handover according to some embodiments.
Figure 11B:
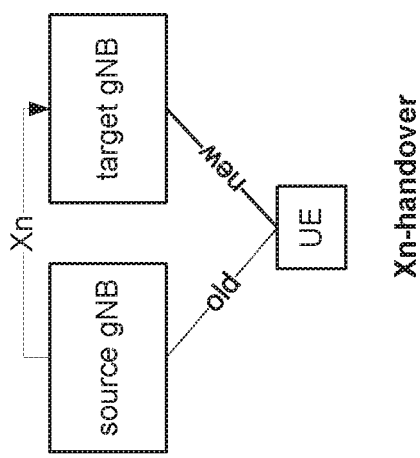
FIG. 11B is a block diagram of an Xn handover according to some embodiments.
Figure 11A:
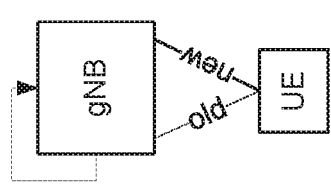
FIG. 11A is a block diagram of an intra-cell handover according to some embodiments.

A first type is an intra-cell handover shown in FIG. 11A. When the source and target cells are the same and served by the same gNB, then intra-cell communication is all internal to that gNB, with the corresponding handover being called an intra-cell handover. It could also happen that the source and the target cells are different but served by the same gNB. Such handover could be called intra-gNB handover. But for purposes herein, the description does not need to differentiate between intra-cell and intra-gNB handover.

A second type is an Xn handover shown in FIG. 11B. When the source and the target cells belong to different gNBs and those gNBs have Xn interface between them, then the inter-cell communication takes place via the Xn interface, with the corresponding handover being called an Xn-handover.

A third type is an N2-handover shown in FIG. 11C. When there is no Xn interface between the gNBs, the handover is facilitated by the AMF, with the corresponding handover being called an N2-handover. During an N2-handover, it could also happen that the source cell/gNB and the target cell/gNB belong to different AMFs. Such handover is still called N2-handover. However, there will be additional inter-AMF communication via the N14 interface.

Similar to the LTE system, the UE behavior is likely to be unified regardless if a handover is of type intra-cell, Xn, or N2.

There currently exist certain challenge(s). The synchronization between the NAS and the AS security contexts, i.e., execution of the UE Context Modification procedure 39, may have race conditions with the handover procedures. More specifically, there may be undesirable situations when the UE Context Modification procedure 39 and Xn/N2-handover are happening concurrently which could cause mismatches between the NAS and the AS security contexts (i.e., could result in the K_gNB being unsynchronized with the K_AMF).

Avoiding such race conditions require specific rules that determine which procedure takes precedence under specific situations and how the gNB 32 and the AMF 34 behave. Such rules are not the optimal solution because they require maintaining unwanted additional states due to race condition and introduce unwanted additional signaling in both core and the radio network. Further, the concurrency handling rules increase the complexity of both the system design and the implementations. A result of complexity is that it makes systems harder to analyze and introduces the risk of incorrect implementations. The security assurance of the deployed systems are hence reduced, which is not desirable.

Certain aspects of the present disclosure and their embodiments may provide solutions to these or other challenges. Some embodiments include a mechanism for fast synchronization between the NAS and the AS security contexts at handover.

For example, in an N2-handover (single AMF) from AMF side, a method may be performed by an AMF 34 for reducing the number of handovers. The method may comprise deciding to trigger a first handover to modify an AS security context. The first handover is to be initiated at a first gNB. The AS security context is currently based on a first NAS security context. But the modification of the AS security context leads the AS security context to be based on a second NAS security context. The method in this regard further comprises receiving a request from the first gNB triggering the AMF to facilitate a second handover to a second gNB.

The method then further comprises facilitating the second handover by sending a message comprising an indication to the second gNB, the indication enabling the second gNB to convey to a UE whether to derive a new AS security context based on the first NAS security context or the second NAS security context. In some embodiments, this method may further comprise not triggering the first handover.

Certain embodiments may provide one or more of the following technical advantage(s). Some embodiments provide a simpler mechanism for quickly synchronizing the NAS and AS security contexts at handover compared to existing solutions. The simplicity comes from reduction in the number of special-case concurrency handling rules, reduction in the signaling between core network and RAN (the actual number of executed NGAP procedures to regain synchronization is reduced), and/or simpler state management (core network no longer needing to maintain and transfer multiple versions of NAS security contexts).

More particularly, some embodiments seek to avoid the race condition arising from concurrently running UE Context Modification and N2-handover procedure, e.g., in 5G. The consequence of such race conditions would be that K_gNB may get unsynchronized with the K_AMF, which is not acceptable. Therefore, 5G needs a way to handle the race condition.

One possible way would be to adapt the mechanisms in 4G or LTE (Long Term Evolution). That would mean that the relevant rules described in 3GPP TS 33.401 (Rules on Concurrent Running of Security Procedures) would be used. In a 5G scenario, the relevant rules would be as follows:

As an adaptation of rule #3, when the UE and the AMF have taken a new K_AMF into use, the AMF shall continue to use the old K_gNB based on the old K_AMF in the N2-handover procedure, until the AMF takes a new K_gNB derived from the new K_AMF into use by means of a UE Context Modification procedure.

As an adaptation of rule #4, when the UE and the AMF have taken a new K_AMF into use, the UE shall continue to use K_gNB based on the old K_AMF in the N2-handover procedure, until the target gNB and the UE perform an intra-cell handover to take a new K_gNB derived from the new K_AMF into use.

As an adaptation of rule #8, when the UE and the source AMF have taken a new K_AMF into use, but the source AMF has not yet successfully performed a UE Context Modification procedure, the source AMF shall send both the old NAS security context (including old K_AMF) and the new NAS security context (including new K_AMF) to the target AMF. This happens during N2-handover involving change of AMFs.

As an adaptation of rule #9, when the target AMF receives both the old NAS security context (including old K_AMF) and the new NAS security context (including new K_AMF), then the target MME shall use the new K_AMF in NAS procedures, but shall continue to use old K_AMF for AS security related parameters, until the completion of a UE Context Modification procedure. This happens during N2-handover involving change of AMFs.

Figure 12:
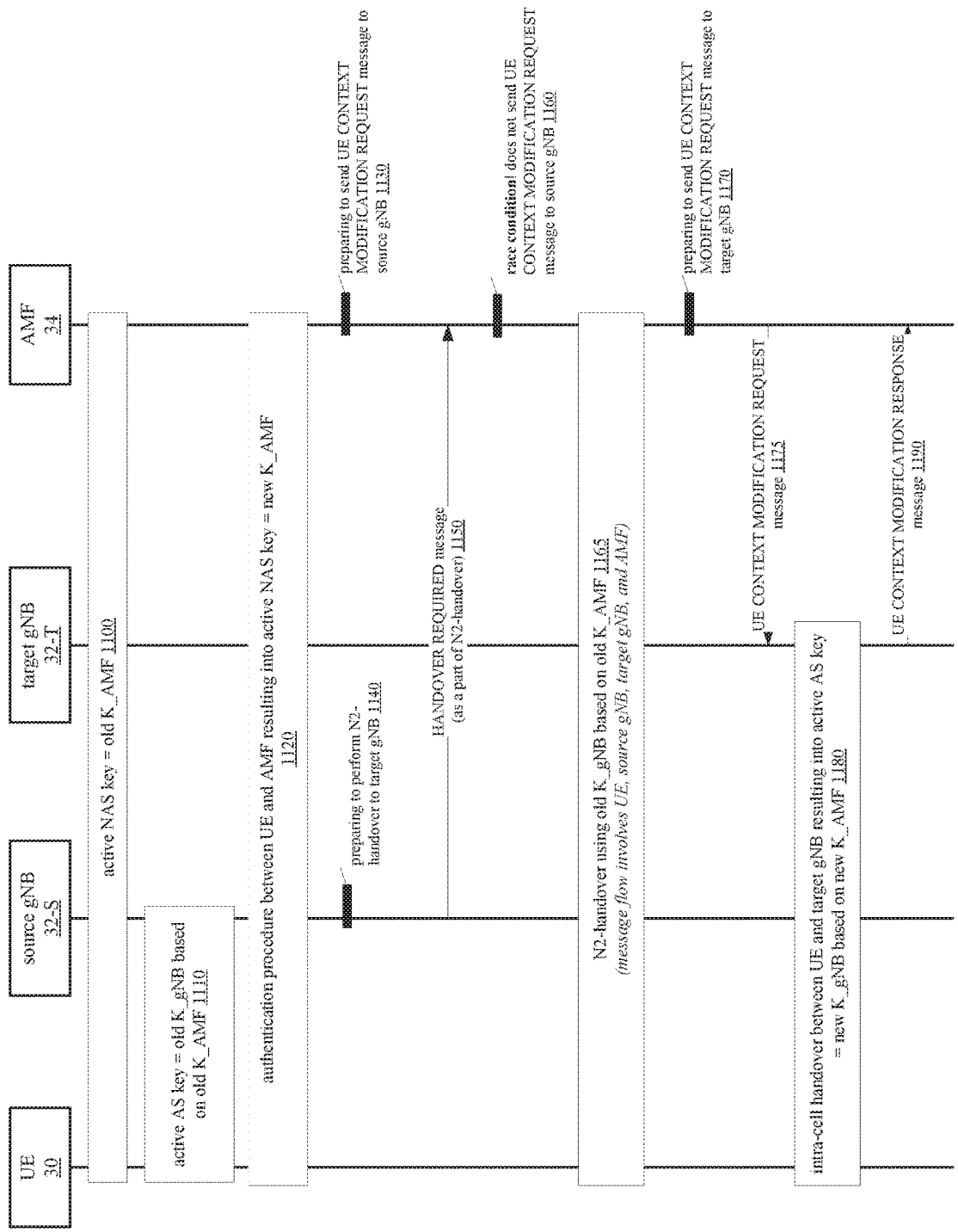
FIG. 12 is a sequence diagram of an N2 handover according to some embodiments.

FIG. 12 illustrates the sequence diagram of implementing the above-mentioned rules. For the sake of simplicity, the figure only shows N2-handover involving a single AMF. As shown, the AMF 34 activates a NAS key, referred to as an old K_AMF (Step 1100). The UE 30 and source gNB 32-S then activate an AS key, referred to as old K_gNB, based on the old K_AMF (Step 1110). An authentication procedure is then performs between the UE 30 and the AMF 34, resulting in activation of a new NAS key, referred to as new K_AMF, i.e., as part of a new NAS security context (Step 1120). The AMF 34 then prepares to send a UE CONTEXT MODIFICATION REQUEST message to the source gNB 32-S, in order to prompt the source gNB 32-S and the UE 30 to base the AS security on the newly activated NAS key, new K_AMF (Step 1130). Meanwhile, however, the source gNB 32-S prepares to perform an N2-handover to a target gNB 32-T (Step 1140) and sends a HANDOVER REQUIRED message to the AMF 34 (as part of the N2-handover) (Step 1150). This creates a race condition at Step 1160. In this example, due to the race condition, the AMF 34 does not send the UE CONTEXT MODIFICATION REQUEST message to the source gNB. Instead, the N2-handover is performed using the old K_gNB based on the old K_AMF (Step 1165). As a result, the AMF 34 prepares to send a UE CONTEXT MODIFICATION REQUEST message to the target gNB (Step 1170) and accordingly sends that message (Step 1175). An intra-cell handover is then performed between the UE 30 and the target gNB 32-T, resulting in a new active AS key, referred to as new K_gNB, based on the new K_AMF (Step 1180). The target gNB 32-T may then send a UE CONTEXT MODIFICATION RESPONSE confirming the modification to the UE context (Step 1190).

This is suboptimal way of handling a race condition between the UE Context Modification and the N2-handover procedures, if the mechanisms in LTE are adapted for 5G. The NAS security is based on the active K_AMF and the AS security is based on the old K_AMF. Therefore, the AMF 34 has to maintain multiple NAS security contexts, one based on the active K_AMF and another based on the old K_AMF. Furthermore, although not shown in the diagram for sake of simplicity, maintaining multiple NAS security contexts creates further complications when the ongoing N2-handover requires a change in AMF. This happens when the source gNB is served by the source AMF, and the target gNB is served by the target AMF. In such case, the source AMF needs to transfer both the old and new NAS security contexts to the target AMF. The target AMF becomes responsible for performing UE Context Modification procedure and, until that succeeds, the AS security is based on the old NAS security context, while the NAS security is based on the new NAS security context. Further, although 3GPP has not yet taken a decision, it could be such that the source AMF performs horizontal key derivation before transferring NAS security context to the target AMF, meaning that the source AMF applies a one-way function like hash or KDF (key derivation function used in 3GPP) to the K_AMF resulting in another key, say K_AMF*, and transfers the K_AMF* to the target AMF. Handling old and new NAS security contexts and horizontal key derivations together further increases the complexity. Still further, just after the N2-handover finishes, there is yet another intra-cell handover which causes unwanted additional signaling both in N2 and radio interface. In 5G, when there are a massive number of UEs and fast delivery of service is crucial, the above mentioned suboptimal way of handling the race condition is not best suited. Therefore, there is a need of a more proper and graceful approach.

Figure 13:
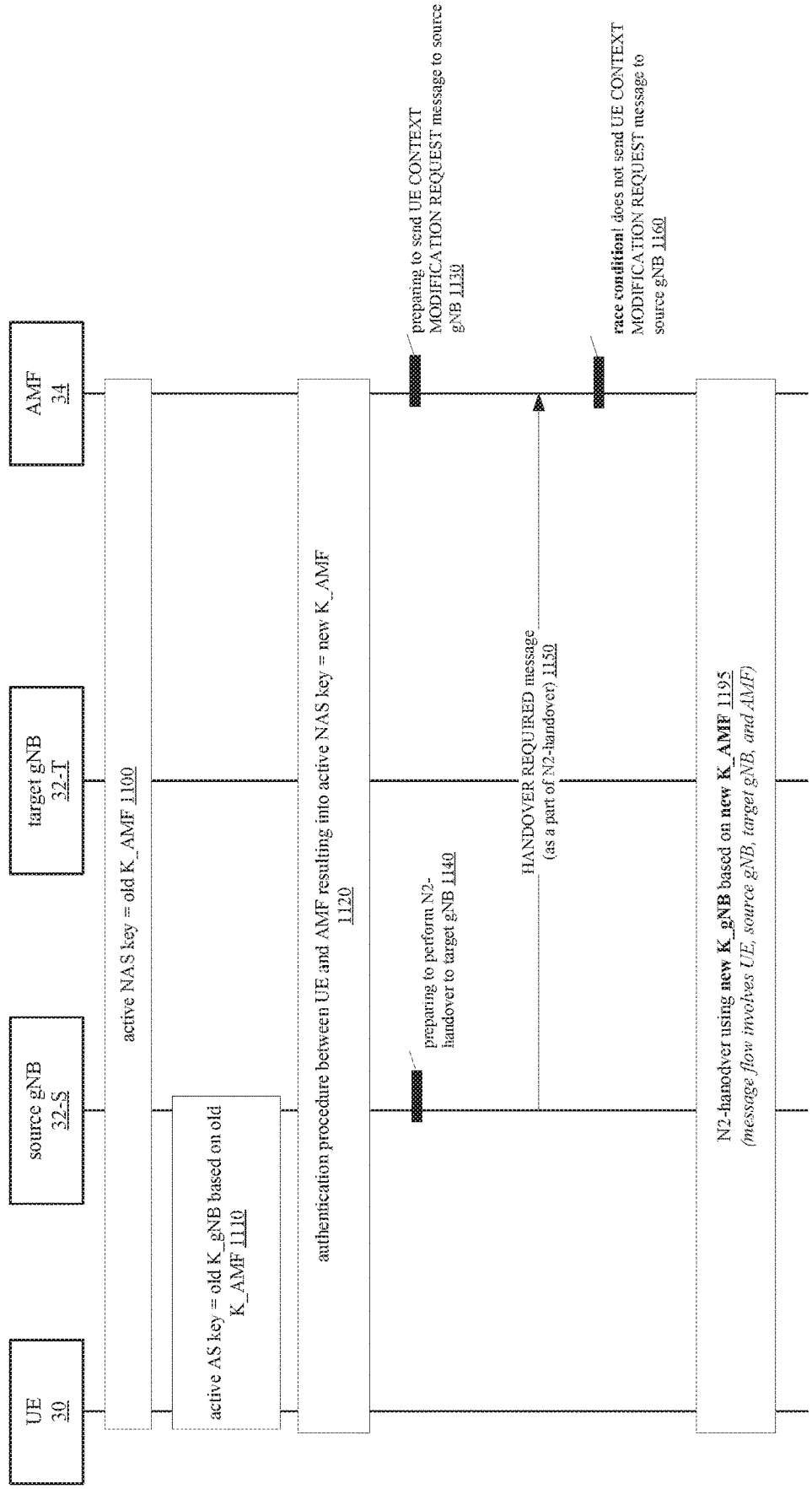
FIG. 13 is a sequence diagram of an N2 handover according to other embodiments.

FIG. 13 illustrates some embodiments for handling a race condition between the UE Context Modification and the N2-handover procedures. In particular, FIG. 13 illustrates an approach according to some embodiments in which, during an N2-handover involving a single AMF, the AMF uses the new K_gNB based on the new K_AMF for the ongoing N2-handover. As shown, for example, rather than performing the N2-handover using the old K_gNB based on the old K_AMF (as in Step 1165 of FIG. 12), the N2-handover is performed using the new K-gNB based on the new K_AMF (Step 1195). The new effect is that, for the new K_gNB based on the new K_AMF to be effective, there is no longer a need for the AMF 34 to perform UE Context Modification procedure and for the target gNB 32-T to perform intra-cell handover procedure. Consequently, all of the suboptimal issues mentioned earlier are resolved.

Note, though, that the message triggering the UE 30 to switch to the target gNB 32-T is called the RRC CONNECTION RECONFIGURATION message, which is sent by the target gNB 32-T and delivered transparently to the UE 30. The RRC CONNECTION RECONFIGURATION message includes a BOOLEAN field called the keyChangeIndicator, which as the name suggests informs the UE that the new K_AMF is in use for derivation of the K_gNB during the ongoing handover. This means that the target gNB 32-T has a mechanism to inform the UE 30 about the use of new K_AMF. The target gNB 32-T is therefore able to set the value of the keyChangeIndicator to TRUE when it receives UE CONTEXT MODIFICATION REQUEST message from the AMF 34. But during the N2-handover, the target gNB 32-T does not know if the AMF 34 has started using the new K_gNB based on the new K_AMF, meaning that the target gNB 32-T is unable to set the value of the keyChangeIndicator to TRUE.

To solve this hurdle, the AMF 34 in some embodiments indicates (e.g., as the signaling 24 described above) to the target gNB 32-T whether or not the new K_AMF is being used for K_gNB. The indication (e.g., signaling 24) may be implemented explicitly, e.g., a separate BOOLEAN field which could be called K_AMF_CHANGE_INDICATOR or New Security Context Indicator (NSCI). The indication may alternatively be implemented implicitly, e.g., sending different data depending upon whether old or new K_AMF was used. Example of sending different data could be, e.g., sending a new K_gNB when new K_AMF was used, and sending intermediate values that could be used to derive K_gNB when old K_AMF was used. Example of intermediate values could be the Next Hop Chaining Counter (NCC) and Next-Hop (NH), i.e., {NCC, NH} pair. By doing so, the target gNB 32-T is aware whether or not the new K_AMF has been used by the AMF 34. Therefore, the target gNB 32-T becomes able to set the value of the keyChangeIndicator field to TRUE or FALSE accordingly. Finally, the UE 30 knows which K_AMF to use, based on the value of the keyChangeIndicator set by the target gNB 32-T.

In yet another way to solve the hurdle, some embodiments reuse existing fields with special meanings, e.g., reserving special value like 0 or 7 for NCC part of {NCC, NH} pair to indicate the use of new K_AMF, meaning that the NH is to be used as the new K_gNB. In yet another way, some embodiments introduce a new indicator (e.g., a BOOLEAN flag) (e.g., as signaling 24) that is transferred transparently from the AMF 34 to the UE 30 such that the intermediate target and source gNBs simply transfer the flag (possibly inside a Radio Resource Control message) to the UE 30 and the UE 30 acts accordingly.

Figure 14:
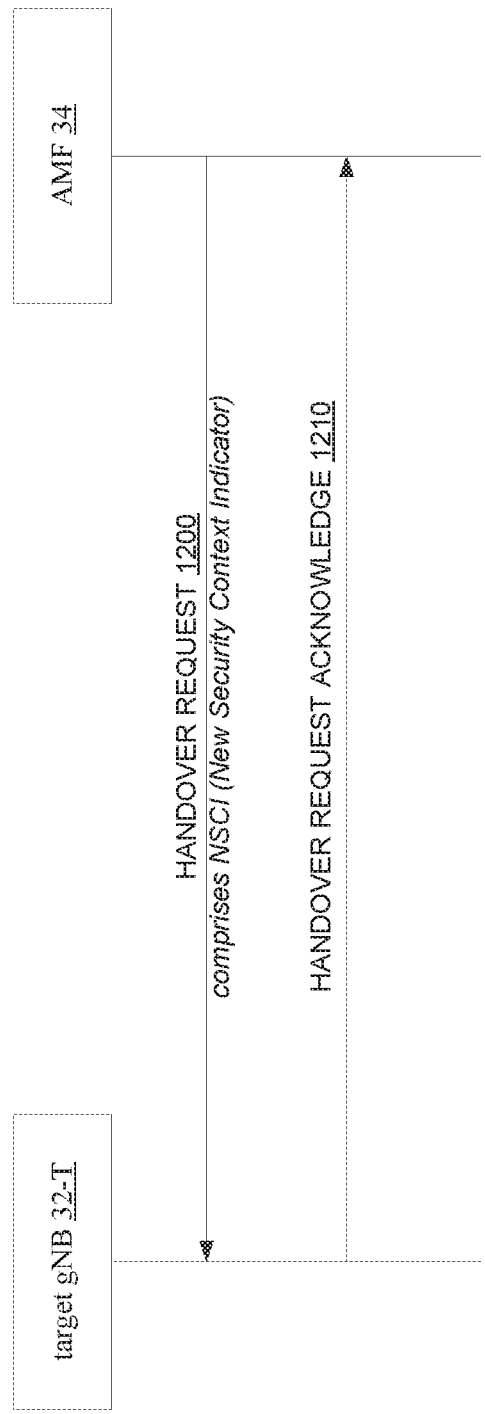
FIG. 14 is a sequence diagram of signalling between an AMF and a target gNB for handover according to some embodiments.

FIG. 14 illustrates some embodiments in which the AMF 34 sends (e.g., as signaling 24) the NSCI along with the {NCC, NH} pair to the target gNB in the N2 HANDOVER REQUEST message 1200 that is part of the Handover Resource Allocation procedure of the ongoing N2-handover. The Handover Resource Allocation procedure (described in the 3GPP TS 38.413) is initiated by the AMF 34 as a part of N2-handover to reserve resources at the target gNB 32-T.

The message sent by the AMF 34 is called the HANDOVER REQUEST message. The contents of the HANDOVER REQUEST message is not yet final for 5G. But, it is more than likely to contain similar data as in 4G or LTE (Long Term Evolution). Among other data, the message will likely include UE security context and UE security capabilities. The UE security context will likely contain a Next Hop Chaining Counter (NCC) and a Next-Hop (NH), i.e., a {NCC, NH} pair, that enables the target gNB to derive and bring into use the K_gNB. Regardless, as shown in FIG. 14, the target gNB 32-T may in response send a HANDOVER REQUEST ACKNOWLEDGE message 1210 to the AMF 34.

It is now described how the K_gNB and the {NCC, NH} pair may be used according to some embodiments. Although, it is not yet final for 5G how the K_gNB and the {NCC, NH} pair are derived, it is likely that a similar mechanism, popularly known as key chaining, in LTE will be used. The key chaining mechanism is at play, not only at handovers, but is initialized when the UE goes to ACTIVE mode, and then derives keys from each other so that they form "chains" at various mobility events, e.g., handovers. If key chaining will be used in 5G, the key changing would be initiated at IDLE to ACTIVE transitions, by the AMF deriving a temporary key called K_gNB_initial by applying a KDF (key derivation function used in 3GPP) to the new K_AMF along with some freshness parameter (which was NAS uplink count in LTE). The K_gNB_initial is associated with the NCC value initialized to '0'. Then, the AMF derives a temporary NH value called NH_1 by applying a KDF to the K_gNB_initial and the new K_AMF. The NH_1 is associated to the NCC value incremented from '0' to '1'. Again, the AMF derives another NH value called NH_2 by applying a KDF to the NH_1 and the new K_AMF. The NH_2 is associated to the NCC value incremented from '1' to '2'. The {NCC, NH} pair in the N2 HANDOVER REQUEST is therefore {'2', the NH_2}. The gNB derives the K_gNB by applying a KDF to the received NH_2 and some parameters (which were physical cell identifier and downlink frequency information in LTE). Another (preferred) alternative is that the NCC, NH) pair in the N2 HANDOVER REQUEST is {'0', the K_gNB_initial}. Therefore, the gNB could directly use the received NH value, i.e., the K_gNB_initial, as the K_gNB. In this alternative, the AMF does not derive further values like NH_1 and NH_2 as mentioned earlier and the UE also has the same key derivation mechanism as the AMF. Regardless, keying material sent from the AMF to the gNB is derived from a higher-level key, the K_AMF.

Further, a confirmation or an acknowledgement 1210 back to AMF 34 from the target gNB 32-T (similar to the one provided by UE CONTEXT MODIFICATION RESPONSE, which means that the UE context update was successful) may be done implicitly or explicitly. As a part of N2-handover, the target gNB 32-T sends a HANDOVER NOTIFY message to the AMF 34 to inform the AMF 34 that the UE 30 has been identified in the target gNB 32-T and the N2 handover has been completed. An example of the implicit acknowledgement is that the AMF uses the HANDOVER NOTIFY as confirmation that the new K_gNB based on the new K_AMF is in place. An example of the explicit acknowledgement is that the target gNB 32-T sends an explicit indication in the HANDOVER NOTIFY or a separate message to the AMF 34. Similarly, a HANDOVER FAILURE message that is sent by the target gNB 32-T to the AMF 34, informing that the handover has failed, an explicit field in the HANDOVER FAILURE message or a separate message could be used to provide an indication to the AMF 34 similarly to the one provided by UE CONTEXT MODIFICATION FAILURE message, which means that UE context update was not successful. Similarly, a HANDOVER CANCEL message that is sent by the source gNB 32-S to the AMF 34, informing that the handover has been cancelled, an explicit field in the HANDOVER CANCEL message or a separate message could be used to provide indication to the AMF 34 similarly to the one provided by UE CONTEXT MODIFICATION FAILURE message, which means that UE context update was not successful. The UE's behavior in case of a failed handover could be similar to in the LTE system, i.e., to discard the keyChangeIndicator and the NCC value that it received as part of the handover and to perform RRC Connection Reestablishment procedure using the old K_gNB. The AMF's behavior in case of failed handover could also be similar to in the LTE system, i.e., to run a NAS security mode command procedure with the UE 30. Any further race condition between the UE Context Modification and the N2-handover procedures will then follow the same mechanism as described earlier.

Figure 15:
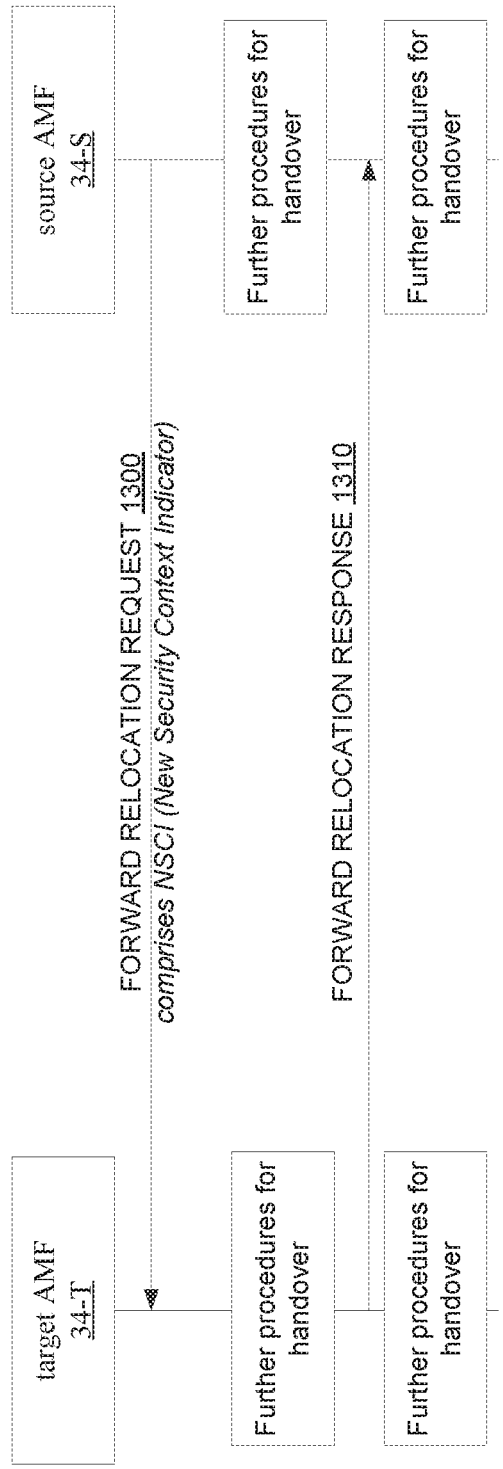
FIG. 15 is a sequence diagram of signalling between a source AMF and a target AMF for handover according to some embodiments.

FIG. 15 illustrates another embodiment in which, during an N2-handover involving a change in AMF, i.e., involving a source AMF 34-S and a target AMF 34-T, the source AMF 34-S sends to the target AMF 34-T the active NAS security context (including the active K_AMF) along with an indicator from which the target AMF 34-T can derive or deduce the value of the NSCI. FIG. 15 for instance shows that the source AMF 34-S sends to the target AMF 34-T a FORWARD RELOCATION REQUEST message 1300 that comprises the NCSI. Note that the absence of the indicator may be used to signal to the target AMF 34-T a particular value for the NSCI. The source AMF 34-S may therefore avoid sending the old NAS security context (including the old K_AMF) to the target AMF 34-T. The target AMF 34-T would then communicate with the target gNB 32-T similarly as described earlier, i.e., preferably, the target AMF 34-T sends the NSCI (e.g., as signaling 24) to the target gNB 32-T along with the {NH, NCC} pair. Mind that the 3GPP has not formally decided whether or not the N14 interface between two AMFs will use the GTPv2, GPRS (General Packet Radio Service) Tunnelling Protocol version 2, as used in S10 interface between two MMEs (Mobility Management Entity) in LTE. FIG. 15 is shown with the assumption that similar mechanism as in LTE's S10 interface will be used in 5G's N14 interface. The S10 interface is specified in the 3GPP TS 29.274.

Further, it is discussed the success or failure indication in the context of FIG. 15. The target AMF 34-T gets a successful or failure indication (corresponding to UE CONTEXT MODIFICATION RESPONSE and UE CONTEXT MODIFICATION FAILURE) from the target gNB 32-T, as described earlier. The target AMF 34-T then can convey the message to the source AMF 34-S either implicitly or explicitly. An example of using implicit indication may be to use existing messages between the target AMF 34-T and the source AMF 34-S for indication of successful or failed handover, such as using a FORWARD RELOCATION COMPLETE NOTIFICATION message 1310 from the target AMF 34-T to the source AMF 34-S as an indication of success. An example of explicit indication may be to use a new message or new field in an existing message. In case the source AMF 34-S learns about the handover failure beforehand, for example from a HANDOVER CANCEL message from the source gNB 32-S, then the source AMF 34-S may notify the target AMF 34-T similarly as in LTE system, for example by sending a RELOCATION CANCEL message. The UE's and source AMF's behavior in case of a failed handover may be similar to in the LTE system as described earlier.

Consider one specific implementation of an N2-handover as an example. Upon reception of the HANDOVER REQUIRED message, the source AMF 34-S shall increase its locally kept NCC value by one and compute a fresh NH from its stored data using a function. The source AMF 34-S shall use the K from the currently active 5GS NAS security context for the computation of the fresh NH. The source AMF 34-S shall send the fresh {NH, NCC} pair to the target AMF 34-T in the N14 FORWARD RELOCATION REQUEST message 1300. The N14 FORWARD RELOCATION REQUEST message 1300 shall in addition contain the $K_{AMF}$ that was used to compute the fresh {NH, NCC} pair and its corresponding nKSI. If the source AMF 34-S had activated a new 5GS NAS security context with a new $K_{AMF}$, different from the 5GS NAS security context on which the currently active 5GS AS security context is based, but has not yet successfully performed a UE Context Modification procedure, the N14 FORWARD RELOCATION REQUEST message 1300 shall in addition contain a NSCI (New Security Context Indicator) meaning that the sent $K_{AMF}$ is a new one. The source AMF 34-S shall in this case derive a new $K_{gNB}$ from the new $K_{KMF}$ and the uplink NAS COUNT in the most recent NAS Security Mode Complete message. The source AMF 34-S shall associate the new $K_{gNB}$ with a new NCC initialized to the value '0'. The source AMF 34-S shall then derive a fresh NH from the new $K_{AMF}$ and the new $K_{gNB}$, by applying a key derivation function, and increase the NCC value with one (i.e. NCC='1'). The source AMF 34-S shall then derive a second fresh NH from the new $K_{AMF}$ and the previous NH by applying a key derivation function, and increasing the NCC with one (i.e. NCC='2').

The target AMF 34-T shall store locally the {NH, NCC} pair received from the source AMF. The target AMF 34-T shall then send the received {NH, NCC} pair and NSCI, if such was also received, to the target gNB 32-T within the N2 HANDOVER REQUEST message. Upon receipt of the N2 HANDOVER REQUEST message from the target AMF 34-T, the target gNB 32-T shall compute the $K_{gNB}$ to be used with the UE 30 by performing a key derivation with the fresh {NH, NCC} pair in the N2 HANDOVER REQUEST and the target NR-PCI and its frequency NR-EARFCN-DL. The target gNB 32-T shall associate the NCC value received from the target AMF 34-T with the $K_{gNB}$. The target gNB 32-T shall include the NCC value from the received {NH, NCC} pair into the RRCConnectionReconfiguration message to the UE 30 and remove any existing unused stored {NH, NCC} pairs. If the target gNB 32-T had received the NSCI, it shall set the keyChangeIndicator field in the RRCConnectionReconfiguration message to true.

Note that the source AMF 34-S may be the same as the target AMF 34-T in the description above. If so, a single AMF 34 performs the roles of both the source and target AMF, i.e. the AMF calculates and stores the fresh {NH, NCC} pair and NSCI if required and sends this to the target gNB 32-T. In this case, actions related to N14 messages are handled internally in the single AMF.

In view of the above, FIG. 16 shows a method 1400 according to some embodiments, e.g., as performed by core network equipment 16 or equipment implementing an AMF. As shown, the method 1400 includes determining that a new NAS security context (e.g., a new 5G NAS security context with a new $K_{AMF}$), different from a NAS security context on which a currently active AS security context is based, has been activated and that a UE context modification procedure has not yet been successfully performed (Block 1410). The method 1400 further includes, e.g., responsive to the determination, transmitting a message (e.g., a forward relocation request message) that contains a key (e.g., the new $K_{AMF}$) from the new NAS security context and that contains an indicator indicating that the key is new (Block 1420). The indicator may for instance take the form of a new security context indicator, NSCI, or take the form of a key change indicator. In some embodiments, the determination and message transmission may be performed after or responsive to receiving a handover required message (Block 1405). Alternatively or additionally, the method 1400 may further include activating the new NAS security context (Block 1402).

In some embodiments, the message in FIG. 16 may be sent to target core network equipment of a handover or to equipment that implements a target AMF for the handover. FIG. 17 illustrates a method 1500 in this case according to some embodiments, e.g., as performed by the target core network equipment or the equipment implementing the target AMF. As shown, the method 1500 includes receiving a message (e.g., a forward relocation request message) that contains a key (e.g., the new $K_{AMF}$) from a new NAS security context and that contains an indicator indicating that the key is new (Block 1510). The indicator may for instance take the form of a new security context indicator, NSCI, or take the form of a key change indicator. Regardless, the method 1500 may further include sending the indicator to target radio access network equipment (e.g., a target gNB) within a handover request message (Block 1520).

As noted above, though, in some embodiments the source and target core network equipment (e.g., source and target AMF) may be the same. FIG. 18 illustrates a method 1600 performed in such a case, e.g., as performed by core network equipment 16 or equipment implementing an AMF. As shown, the method 1600 includes determining that a new NAS security context (e.g., a new 5G NAS security context with a new $K_{AMF}$), different from a NAS security context on which a currently active AS security context is based, has been activated and that a UE context modification procedure has not yet been successfully performed (Block 1410). The method 1600 further includes, e.g., responsive to the determination, transmitting to target radio access network equipment (e.g., a target gNB) a handover request message that contains an indicator indicating that a key of a NAS security context is new (Block 1620). The indicator may for instance take the form of a new security context indicator, NSCI, or take the form of a key change indicator. In some embodiments, the determination and message transmission may be performed after or responsive to receiving a handover required message (Block 1605). Alternatively or additionally, the method 1400 may further include activating the new NAS security context (Block 1602).

Regardless, FIG. 19 illustrates a method performed by target radio access network equipment according to some embodiments. The method 1700 includes receiving a handover request message that contains an indicator indicating that a key of a NAS security context is new (Block 1710). The indicator may for instance take the form of a new security context indicator, NSCI, or take the form of a key change indicator. The method 1700 also includes setting a key change indicator field of an RRC connection reconfiguration message (e.g., as part of a handover command message) based on the indicator in the handover request message (Block 1720). For example, if the handover request message included the indicator, the key change indicator field may be set to true. Regardless, the method 1700 as shown further includes transmitting the RRC Connection Reconfiguration message (Block 1730).

Finally, it is described how the race condition between the UE Context Modification and the Xn-handover procedures may be handled according to some embodiments. The Xn-handover is different from N2-handover because the AMF is involved only after the handover has already been executed between the source gNB and the target gNB via the Xn interface. The Xn-handover is described in the 3GPP TS 23.502.

Similar to the N2-handover case, adapting the relevant rules described in 3GPP TS 33.401 (Rules on Concurrent Running of Security Procedures) for Xn-handover case would result in suboptimal solution. The race condition in this case is that the AMF 34 receives a PATH SWITCH REQUEST message from the target gNB 32-T before the AMF 34 sends a UE CONTEXT MODIFICATION REQUEST message to the source gNB 32-S. The PATH SWITCH REQUEST message which is part of N2 Path Switch Request procedure is described in the 3GPP TS 38.413. In the suboptimal solution, the AMF 34 then does not send the UE CONTEXT MODIFICATION REQUEST message to the source gNB 32-S; instead it sends the PATH SWITCH REQUEST ACKNOWLEDGE message (described in 3GPP TS 38.413) to the target gNB 32-T. After the completion of the Xn-handover, the AMF 34 will then perform UE Context Modification procedure with the target gNB 32-T and the target gNB 32-T will in turn perform an intra-cell handover with the UE.

Figure 20:
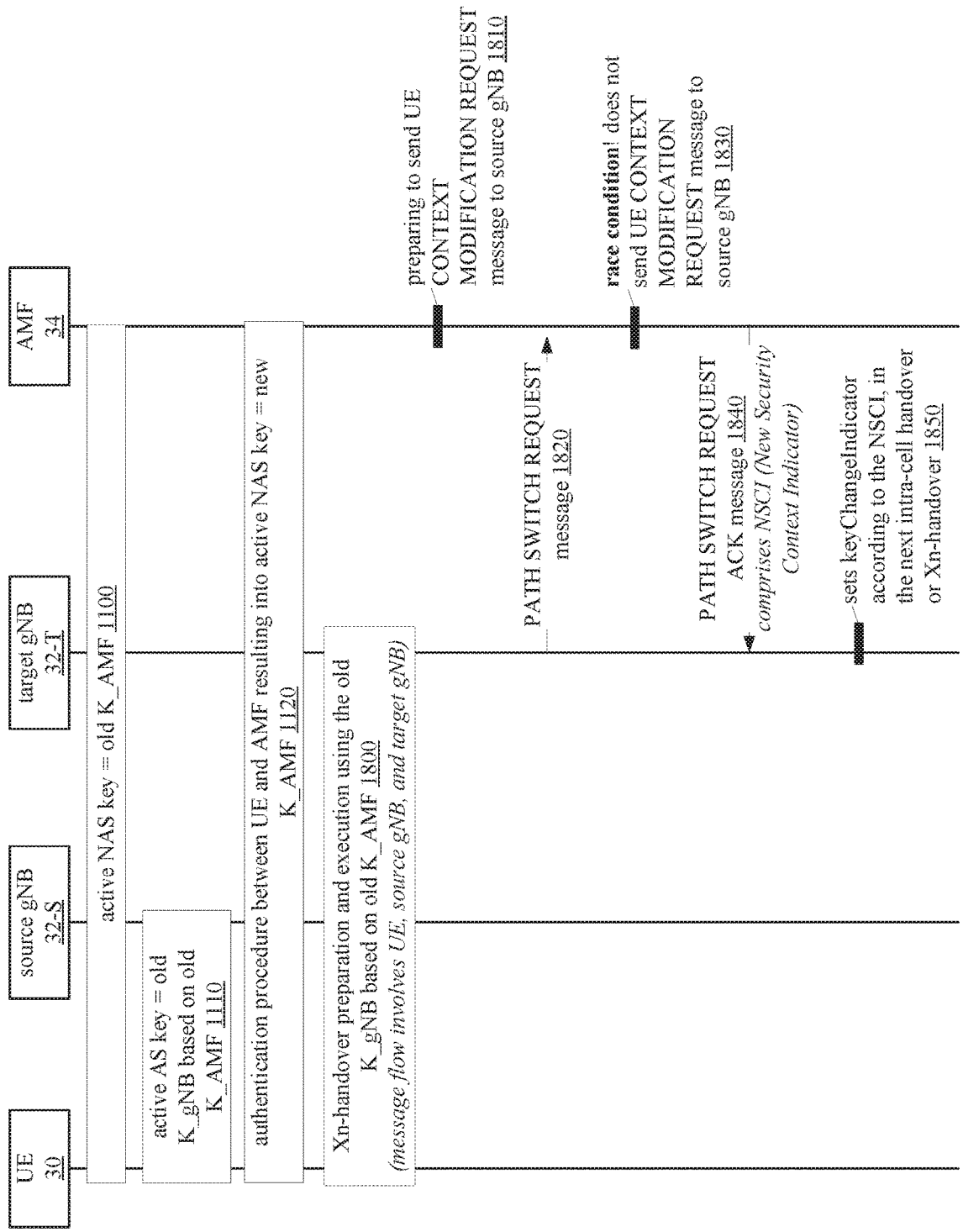
FIG. 20 is a sequence diagram of an Xn handover according to some embodiments.

FIG. 20 illustrates some embodiments for handling such race condition in the Xn-handover case. As shown, after the activation of the new NAS key, new K_AMF, in Step 1120 as described above, the Xn handover is prepared and executed using the old K_gNB based on the old K_AMF (Step 1800). While the AMF 34 is preparing to send a UE CONTEXT MODIFICATION REQUEST message to the source gNB (Step 1810), to account for the newly activated NAS key, the AMF 34 receives a PATH SWITCH REQUEST message from the target gNB 32-T for the Xn handover (Step 1820). As a result, a race condition exists and in this example the AMF 34 does not send the UE CONTEXT MODIFICATION REQUEST to the source gNB (Step 1830). Instead, in one or more embodiments, the AMF 34 sends the NSCI (e.g., as signaling 24) along with the {NCC, NH} pair to the target gNB 32-T in the PATH SWITCH REQUEST ACKNOWLEDGE message that is part of the N2 Path Switch Request procedure (Step 1840). In other embodiments, existing fields are reused with special meanings as described earlier.

The target gNB 32-T receives the NSCI value and the {NCC, NH} pair from the AMF 34 and then in some embodiments performs an intra-cell handover immediately or for some reason, like fast moving UE, performs yet another Xn-handover. The target gNB 32-T sets the key-ChangeIndicator in the RRC Connection Reconfiguration message according to the value of the NSCI (Step 1850). The AMF 34 no longer needs to perform an additional UE Context Modification procedure. The target gNB 32-T may send an explicit success or failure indication to the AMF 34 to convey similar information as by the UE CONTEXT MODIFICATION RESPONSE and the UE CONTEXT MODIFICATION FAILURE messages. An example of such explicit indications may be to introduce new messages in the Path Switch Request procedure, say PATH SWITCH REQUEST COMPLETE message. The indications may also be implicit for example—not receiving any failure message from target gNB 32-T means a success.

In view of the above, FIG. 21 shows a method 1900 according to some embodiments, e.g., as performed by core network equipment 16 or equipment implementing an AMF. As shown, the method 1900 includes receiving a path switch request message from target radio access network equipment (e.g., target gNB) (Block 1905). The method 1900 also includes determining that a new NAS security context (e.g., a new 5G NAS security context with a new $K_{AMF}$), e.g., different from a NAS security context on which a currently active AS security context is based, has been activated (Block 1910). Although not shown, the determination in some embodiments may also include determining that a UE context modification procedure has not yet been successfully performed. The method 1900 further includes, e.g., responsive to the determination, transmitting to the target radio access network equipment a path switch request acknowledgement message that contains a new security context indicator, NSCI (Block 1920). The NSCI may for instance indicate that a new NAS security context has been activated. In some embodiments, the method 1900 may further include activating the new NAS security context (Block 1902).

FIG. 22 illustrates a method 2000 according to some embodiments, e.g., as performed by the target core network equipment or the equipment implementing the target AMF. As shown, the method 2000 includes receiving a path switch request acknowledgement message that contains a new security context indicator, NSCI (Block 2010). The NSCI may for instance indicate that a new NAS security context has been activated. Regardless, the method 2000 may further include setting a key change indicator field of an RRC connection reconfiguration message (e.g., as part of a handover command message for further handovers) based on the NSCI (Block 2020). The method 2000 as shown further includes transmitting the RRC Connection Reconfiguration message (Block 2030).

Despite explanation in the context of NR in some embodiments, it will be appreciated that the techniques may be applied to other wireless networks, as well as to successors of NR. Thus, references herein to signals using terminology from the 3GPP standards should be understood to apply more generally to signals having similar characteristics and/or purposes, in other networks.

Some exemplary embodiments will now be enumerated below. Embodiment 1 is a method performed by core network equipment configured for use in a core network of a wireless communication system. The method in some embodiments comprises, during or in association with a handover procedure for handover of a user equipment, signaling from the core network equipment whether any new non-access stratum (NAS) security context between the user equipment and the core network equipment is to be used as a basis for an access stratum (AS) security context between the user equipment and radio network equipment.

Embodiment 2 is a method performed by equipment configured for use in a wireless communication system. The method in some embodiments comprises, during or in association with a handover procedure for handover of a user equipment, receiving signaling from core network equipment indicating whether any new non-access stratum (NAS) security context between the user equipment and the core network equipment is to be used as a basis for an access stratum (AS) security context between the user equipment and radio network equipment.

Embodiment 3 is the method of embodiment 2, further comprising: determining, based on the signaling, a NAS security context to use as a basis for the AS security context; and using the AS security context as based on the determined NAS security context.

Embodiment 4 is the method of any of embodiments 2-3, wherein the method is performed by target radio network equipment to which the user equipment is to be handed over by the handover.

Embodiment 5 is the method of any of embodiments 2-4, further comprising, based on the signaling from the core network equipment, signaling towards the user equipment: whether the NAS security context on which the AS security context is based has changed; or whether any new NAS security context between the user equipment and the core network equipment is to be used as the basis for the AS security context.

Embodiment 6 is the method of embodiment 5, wherein the signaling towards the user equipment is performed by transmitting a key change indicator to the user equipment in a radio resource control (RRC) connection reconfiguration message.

Embodiment 7 is the method of any of embodiments 2-3, wherein the method is performed by the user equipment.

Embodiment 8 is the method of any of embodiments 1-7, wherein a new NAS security context is different than a NAS security context on which is based an AS security context between the user equipment and source radio network equipment of the handover.

Embodiment 9 is the method of any of embodiments 1-8, wherein a new NAS security context is a NAS security context that the user equipment and the core network equipment have switched to using but an AS security context based on that NAS security context has not been put into use.

Embodiment 10 is the method of any of embodiments 1-9, wherein the signaling is during the handover procedure.

Embodiment 11 is the method of any of embodiments 1-10, wherein the handover procedure is for handover of the user equipment to target radio network equipment, and wherein the signaling is from the core network equipment to the target radio network equipment.

Embodiment 12 is the method of embodiment 11, wherein whether any new NAS security context is to be used as the basis for the AS security context is signaled by a field of a handover request message transmitted by the core network equipment.

Embodiment 13 is the method of any of embodiments 1-10, wherein the signaling is from the core network equipment to the user equipment.

Embodiment 14 is the method of any of embodiments 1-10, wherein the handover procedure is for handover of the user equipment from source radio network equipment to target radio network equipment, wherein the core network equipment comprises source core network equipment associated with the source radio network equipment, and wherein the signaling is from the core network equipment to target core network equipment associated with the target radio network equipment.

Embodiment 15 is the method of embodiment 14, wherein whether any new NAS security context is to be used as the basis for the AS security context is signaled by a field of a forward relocation request message transmitted by the core network equipment.

Embodiment 16 is the method of any of embodiments 1-15, wherein the handover procedure is for handover of the user equipment to target radio network equipment, and wherein the AS security context is between the user equipment and the target radio network equipment.

Embodiment 17 is the method of any of embodiments 1-16, wherein the signaling is responsive to a handover required message transmitted from source radio network equipment of the handover to the core network equipment or responsive to a path switch request transmitted from target radio network equipment of the handover to the core network equipment.

Embodiment 18 is the method of any of embodiments 1-11 and 17, wherein whether any new NAS security context is to be used as the basis for the AS security context is signaled by a field of a path switch request acknowledgement message transmitted by the core network equipment.

Embodiment 19 is the method of any of embodiments 1-11 and 17-18, wherein the handover procedure is for a first handover of the user equipment to first radio network equipment, wherein the signaling is from the core network equipment to the first radio network equipment, and wherein the AS security context is between the user equipment and second target radio network equipment to which the user equipment is to be handed over in any second handover that occurs next after the first handover.

Embodiment 20 is the method of any of embodiments 1-19, wherein whether any new NAS security context is to be used as the basis for the AS security context is signaled by a boolean field of a message transmitted by the core network equipment, wherein the boolean field is configured to be set to true if a new NAS security context is to be used as the basis for the AS security context and false if a new NAS security context is not to be used as the basis for the AS security context.

Embodiment 21 is the method of any of embodiments 1-19, wherein whether any new NAS security context is to be used as the basis for the AS security context is signaled by different data parameters being transmitted by the core network equipment depending on whether any new NAS security context is to be used as the basis for the AS security context.

Embodiment 22 is the method of any of embodiments 1-21, wherein the signaling signals whether a base key for any new NAS security context is to be used for deriving a base key for the AS security context.

Embodiment 23 is the method of any of embodiments 1-22, wherein the core network equipment implements an access and mobility management function (AMF) in a core network of a 5G or New Radio (NR) wireless communication system.

Embodiment 24 is core network equipment configured for use in a core network of a wireless communication system, the core network equipment configured to: during or in association with a handover procedure for handover of a user equipment, signal from the core network equipment whether any new non-access stratum (NAS) security context between the user equipment and the core network equipment is to be used as a basis for an access stratum (AS) security context between the user equipment and radio network equipment.

Embodiment 25 is the core network equipment of embodiment 24, configured to perform the method of any of embodiments 8-23.

Embodiment 26 is core network equipment configured for use in a core network of a wireless communication system, the core network equipment comprising: processing circuitry and memory, the memory containing instructions executable by the processing circuitry whereby the core network equipment is configured to, during or in association with a handover procedure for handover of a user equipment, signal from the core network equipment whether any new non-access stratum (NAS) security context between the user equipment and the core network equipment is to be used as a basis for an access stratum (AS) security context between the user equipment and radio network equipment.

Embodiment 27 is the core network equipment of embodiment 26, the memory containing instructions executable by the processing circuitry whereby the core network equipment is configured to perform the method of any of embodiments 8-23.

Embodiment 28 is equipment configured for use in a wireless communication system, the equipment configured to: during or in association with a handover procedure for handover of a user equipment, receive signaling from core network equipment indicating whether any new non-access stratum (NAS) security context between the user equipment and the core network equipment is to be used as a basis for an access stratum (AS) security context between the user equipment and radio network equipment.

Embodiment 29 is the equipment of embodiment 28, configured to perform the method of any of embodiments 3-23.

Embodiment 30 is equipment configured for use in a wireless communication system, the equipment comprising: processing circuitry and memory, the memory containing instructions executable by the processing circuitry whereby the equipment is configured to during or in association with a handover procedure for handover of a user equipment, receive signaling from core network equipment indicating whether any new non-access stratum (NAS) security context between the user equipment and the core network equipment is to be used as a basis for an access stratum (AS) security context between the user equipment and radio network equipment.

Embodiment 31 is the equipment of embodiment 30, the memory containing instructions executable by the processing circuitry whereby the equipment is configured to perform the method of any of embodiments 3-23.

Embodiment 32 is a computer program comprising instructions which, when executed by at least one processor of equipment configured for use in a wireless communication system, causes the equipment to perform the method of any of embodiments 1-23.

Embodiment 33 is a carrier containing the computer program of embodiment 32, wherein the carrier is one of an electronic signal, optical signal, radio signal, or computer readable storage medium.

Embodiment 34 is a method performed by core network equipment configured for use in a core network of a wireless communication system, the method comprising: during or in association with a handover procedure for handover of a user equipment from source radio network equipment to target radio network equipment, signaling from the core network equipment whether or not a non-access stratum (NAS) security context that the user equipment and the core network equipment are using has changed to be different than a NAS security context on which an access stratum (AS) security context between the user equipment and the source radio network equipment is based.

Embodiment 35 is a method performed by core network equipment configured for use in a core network of a wireless communication system, the method comprising: during or in association with a handover procedure for handover of a user equipment, signaling from the core network equipment whether or not a NAS security context, on which an access stratum (AS) security context between the user equipment and radio network equipment is to be based, has changed.

Embodiment 36 is a method performed by core network equipment configured for use in a core network of a wireless communication system, the method comprising: during or in association with a handover procedure for handover of a user equipment, signaling from the core network equipment which non-access stratum (NAS) security context between the user equipment and the core network equipment is to be used as a basis for an access stratum (AS) security context between the user equipment and radio network equipment.

Embodiment 37 is the method of any of embodiments 34-36, comprising any of the steps of any of embodiments 8-23.

Embodiment 38 is a method performed by core network equipment configured for use in a core network of a wireless communication system, the method comprising: during a handover procedure for handover of a user equipment, signaling from the core network equipment whether any new non-access stratum (NAS) security key is to be used as a basis for an access stratum (AS) security key in the handover procedure.

Core network equipment herein is any type of equipment configured for use in a core network of a wireless communication system. Examples of core network equipment include for instance equipment implementing access and mobility management functions (AMF), session management functions (SMF), or the like.

Radio equipment herein is any type of equipment configured for radio communication with other radio equipment. The radio equipment may for instance constitute radio access network equipment (e.g., a base station) or user equipment (UE). Radio access network equipment is any equipment capable of communicating with a user equipment over radio signals. Examples of radio access network equipment include, but are not limited to, base stations (BSs), radio base stations, Node Bs, multi-standard radio (MSR) radio nodes such as MSR BSs, evolved Node Bs (eNBs), gNodeBs (gNBs), femto base stations, pico base stations, micro base stations, macro base stations, one or more (or all) parts of a distributed radio base station such as centralized digital units and/or remote radio units (which may or may not be integrated with an antenna as an antenna integrated radio), network controllers, radio network controllers (RNCs), base station controllers (BSCs), relay nodes, relay donor node controlling relays, base transceiver stations (BTSs), access points (APs), radio access points, transmission points, transmission nodes, Remote Radio Units (RRUs), Remote Radio Heads (RRHs), nodes in a distributed antenna system (DAS), etc.

A user equipment is any type device capable of communicating with radio access network equipment over radio signals. A user equipment may therefore refer to a machine-to-machine (M2M) device, a machine-type communications (MTC) device, a NB-IoT device, etc. However it should be noted that the UE does not necessarily have a "user" in the sense of an individual person owning and/or operating the device. A user equipment may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a user equipment as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a user equipment as described herein may be comprised in a vehicle and may perform monitoring and/or reporting of the vehicle's operational status or other functions associated with the vehicle.

Figure 23:
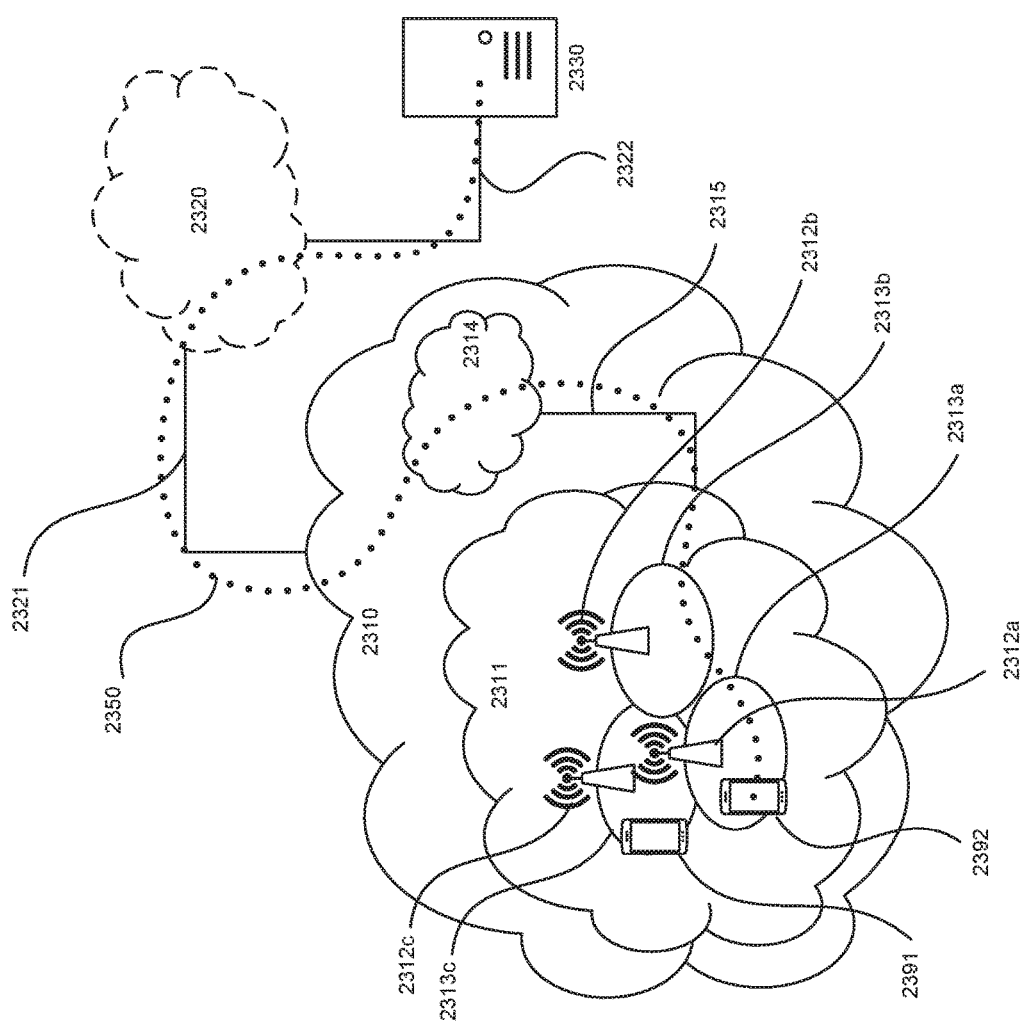
FIG. 23 is a block diagram of a telecommunication network according to some embodiments.

FIG. 23 illustrates a telecommunication network connected via an intermediate network to a host computer in accordance with some embodiments. In particular, with reference to FIG. 23, in accordance with an embodiment, a communication system includes telecommunication network 2310, such as a 3GPP-type cellular network, which comprises access network 2311, such as a radio access network, and core network 2314. Access network 2311 comprises a plurality of base stations 2312a, 2312b, 2312c, such as NBs, eNBs, gNBs or other types of wireless access points, each defining a corresponding coverage area 2313a, 2313b, 2313c. Each base station 2312a, 2312b, 2312c is connectable to core network 2314 over a wired or wireless connection 2315. A first UE 2391 located in coverage area 2313c is configured to wirelessly connect to, or be paged by, the corresponding base station 2312c. A second UE 2392 in coverage area 2313a is wirelessly connectable to the corresponding base station 2312a. While a plurality of UEs 2391, 2392 are illustrated in this example, the disclosed embodiments are equally applicable to a situation where a sole UE is in the coverage area or where a sole UE is connecting to the corresponding base station 2312.

Telecommunication network 2310 is itself connected to host computer 2330, which may be embodied in the hardware and/or software of a standalone server, a cloud-implemented server, a distributed server or as processing resources in a server farm. Host computer 2330 may be under the ownership or control of a service provider, or may be operated by the service provider or on behalf of the service provider. Connections 2321 and 2322 between telecommunication network 2310 and host computer 2330 may extend directly from core network 2314 to host computer 2330 or may go via an optional intermediate network 2320. Intermediate network 2320 may be one of, or a combination of more than one of, a public, private or hosted network; intermediate network 2320, if any, may be a backbone network or the Internet; in particular, intermediate network 2320 may comprise two or more sub-networks (not shown).

The communication system of FIG. 23 as a whole enables connectivity between the connected UEs 2391, 2392 and host computer 2330. The connectivity may be described as an over-the-top (OTT) connection 2350. Host computer 2330 and the connected UEs 2391, 2392 are configured to communicate data and/or signaling via OTT connection 2350, using access network 2311, core network 2314, any intermediate network 2320 and possible further infrastructure (not shown) as intermediaries. OTT connection 2350 may be transparent in the sense that the participating communication devices through which OTT connection 2350 passes are unaware of routing of uplink and downlink communications. For example, base station 2312 may not or need not be informed about the past routing of an incoming downlink communication with data originating from host computer 2330 to be forwarded (e.g., handed over) to a connected UE 2391. Similarly, base station 2312 need not be aware of the future routing of an outgoing uplink communication originating from the UE 2391 towards the host computer 2330.

Figure 24:
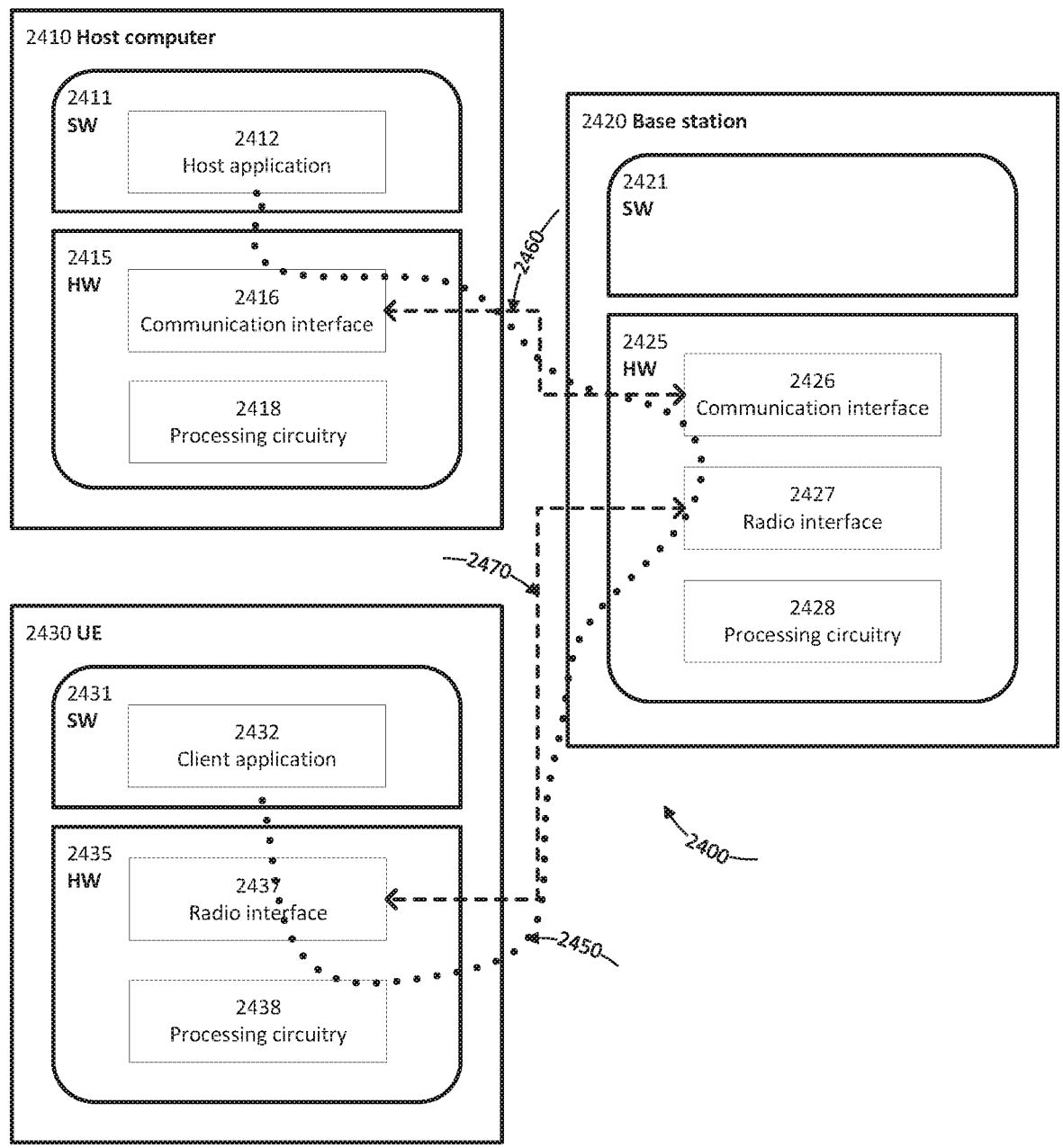
FIG. 24 is a block diagram of a UE, base station, and host computer according to some embodiments.

Example implementations, in accordance with an embodiment, of the UE, base station and host computer discussed in the preceding paragraphs will now be described with reference to FIG. 24. FIG. 24 illustrates host computer communicating via a base station with a user equipment over a partially wireless connection in accordance with some embodiments In communication system 2400, host computer 2410 comprises hardware 2415 including communication interface 2416 configured to set up and maintain a wired or wireless connection with an interface of a different communication device of communication system 2400. Host computer 2410 further comprises processing circuitry 2418, which may have storage and/or processing capabilities. In particular, processing circuitry 2418 may comprise one or more programmable processors, application-specific integrated circuits, field programmable gate arrays or combinations of these (not shown) adapted to execute instructions. Host computer 2410 further comprises software 2411, which is stored in or accessible by host computer 2410 and executable by processing circuitry 2418. Software 2411 includes host application 2412. Host application 2412 may be operable to provide a service to a remote user, such as UE 2430 connecting via OTT connection 2450 terminating at UE 2430 and host computer 2410. In providing the service to the remote user, host application 2412 may provide user data which is transmitted using OTT connection 2450.

Communication system 2400 further includes base station 2420 provided in a telecommunication system and comprising hardware 2425 enabling it to communicate with host computer 2410 and with UE 2430. Hardware 2425 may include communication interface 2426 for setting up and maintaining a wired or wireless connection with an interface of a different communication device of communication system 2400, as well as radio interface 2427 for setting up and maintaining at least wireless connection 2470 with UE 2430 located in a coverage area (not shown in FIG. 24) served by base station 2420. Communication interface 2426 may be configured to facilitate connection 2460 to host computer 2410. Connection 2460 may be direct or it may pass through a core network (not shown in FIG. 24) of the telecommunication system and/or through one or more intermediate networks outside the telecommunication system. In the embodiment shown, hardware 2425 of base station 2420 further includes processing circuitry 2428, which may comprise one or more programmable processors, application-specific integrated circuits, field programmable gate arrays or combinations of these (not shown) adapted to execute instructions. Base station 2420 further has software 2421 stored internally or accessible via an external connection.

Communication system 2400 further includes UE 2430 already referred to. Its hardware 2435 may include radio interface 2437 configured to set up and maintain wireless connection 2470 with a base station serving a coverage area in which UE 2430 is currently located. Hardware 2435 of UE 2430 further includes processing circuitry 2438, which may comprise one or more programmable processors, application-specific integrated circuits, field programmable gate arrays or combinations of these (not shown) adapted to execute instructions. UE 2430 further comprises software 2431, which is stored in or accessible by UE 2430 and executable by processing circuitry 2438. Software 2431 includes client application 2432. Client application 2432 may be operable to provide a service to a human or non-human user via UE 2430, with the support of host computer 2410. In host computer 2410, an executing host application 2412 may communicate with the executing client application 2432 via OTT connection 2450 terminating at UE 2430 and host computer 2410. In providing the service to the user, client application 2432 may receive request data from host application 2412 and provide user data in response to the request data. OTT connection 2450 may transfer both the request data and the user data. Client application 2432 may interact with the user to generate the user data that it provides.

It is noted that host computer 2410, base station 2420 and UE 2430 illustrated in FIG. 24 may be similar or identical to host computer 2330, one of base stations 2312a, 2312b, 2312c and one of UEs 2391, 2392 of FIG. 23, respectively. This is to say, the inner workings of these entities may be as shown in FIG. 24 and independently, the surrounding network topology may be that of FIG. 23.

In FIG. 24, OTT connection 2450 has been drawn abstractly to illustrate the communication between host computer 2410 and UE 2430 via base station 2420, without explicit reference to any intermediary devices and the precise routing of messages via these devices. Network infrastructure may determine the routing, which it may be configured to hide from UE 2430 or from the service provider operating host computer 2410, or both. While OTT connection 2450 is active, the network infrastructure may further take decisions by which it dynamically changes the routing (e.g., on the basis of load balancing consideration or reconfiguration of the network).

Wireless connection 2470 between UE 2430 and base station 2420 is in accordance with the teachings of the embodiments described throughout this disclosure. One or more of the various embodiments improve the performance of OTT services provided to UE 2430 using OTT connection 2450, in which wireless connection 2470 forms the last segment. More precisely, the teachings of these embodiments can improve one or more of data rate, latency, and/or power consumption associated with one or more devices and/or communications of/performed in communication system B-00, and thereby can provide benefits for OTT user data communication, such as one or more of reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 2450 between host computer 2410 and UE 2430, in response to variations in the measurement results. The measurement procedure and/or the network functionality for reconfiguring OTT connection 2450 may be implemented in software 2411 and hardware 2415 of host computer 2410 or in software 2431 and hardware 2435 of UE 2430, or both.

In embodiments, sensors (not shown) may be deployed in or in association with communication devices through which OTT connection 2450 passes; the sensors may participate in the measurement procedure by supplying values of the monitored quantities exemplified above, or supplying values of other physical quantities from which software 2411, 2431 may compute or estimate the monitored quantities. The reconfiguring of OTT connection 2450 may include message format, retransmission settings, preferred routing etc.; the reconfiguring need not affect base station 2420, and it may be unknown or imperceptible to base station 2420.

Such procedures and functionalities may be known and practiced in the art. In certain embodiments, measurements may involve proprietary UE signaling facilitating host computer 2410's measurements of throughput, propagation times, latency and the like. The measurements may be implemented in that software 2411 and 2431 causes messages to be transmitted, in particular empty or 'dummy' messages, using OTT connection 2450 while it monitors propagation times, errors etc.

Figure 25:
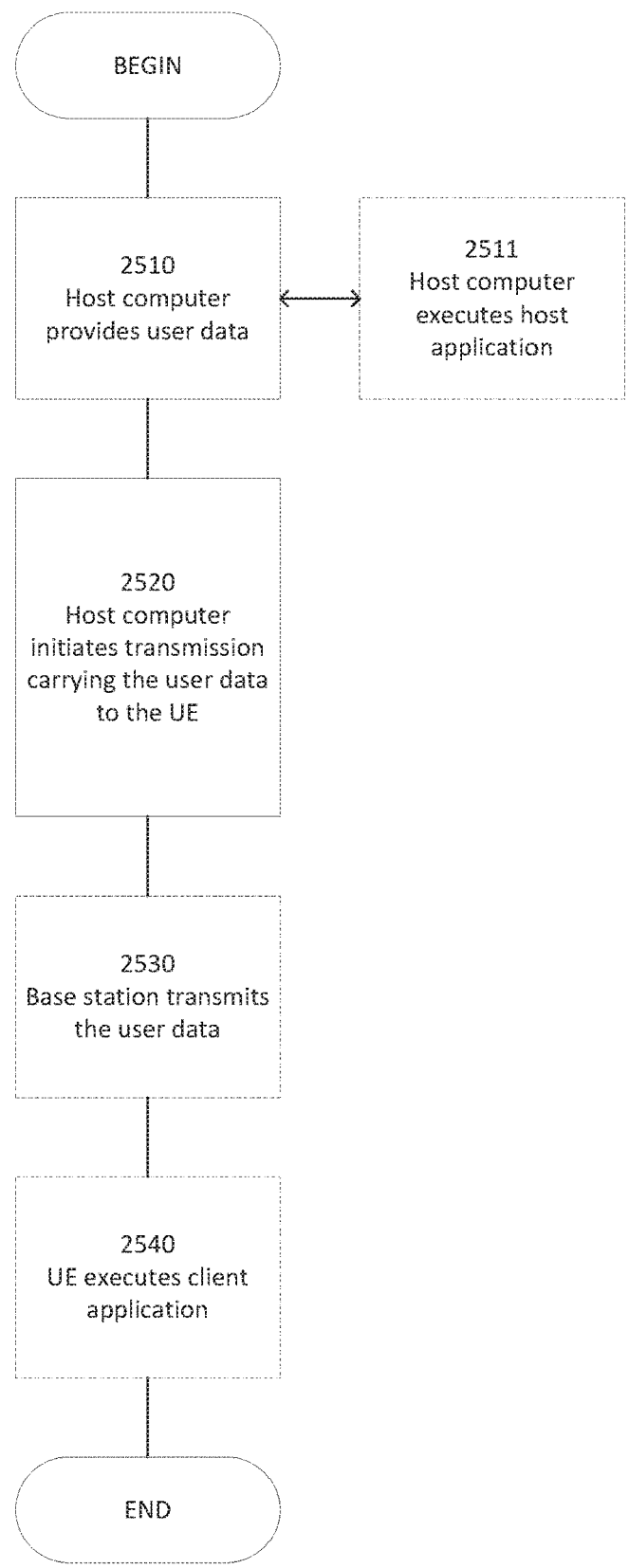
FIG. 25 is a flowchart illustrating a method implemented in a communication system according to one embodiment.

FIG. 25 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 25 will be included in this section. In step 2510, the host computer provides user data. In substep 2511 (which may be optional) of step 2510, the host computer provides the user data by executing a host application. In step 2520, the host computer initiates a transmission carrying the user data to the UE. In step 2530 (which may be optional), the base station transmits to the UE the user data which was carried in the transmission that the host computer initiated, in accordance with the teachings of the embodiments described throughout this disclosure. In step 2540 (which may also be optional), the UE executes a client application associated with the host application executed by the host computer.

Figure 26:
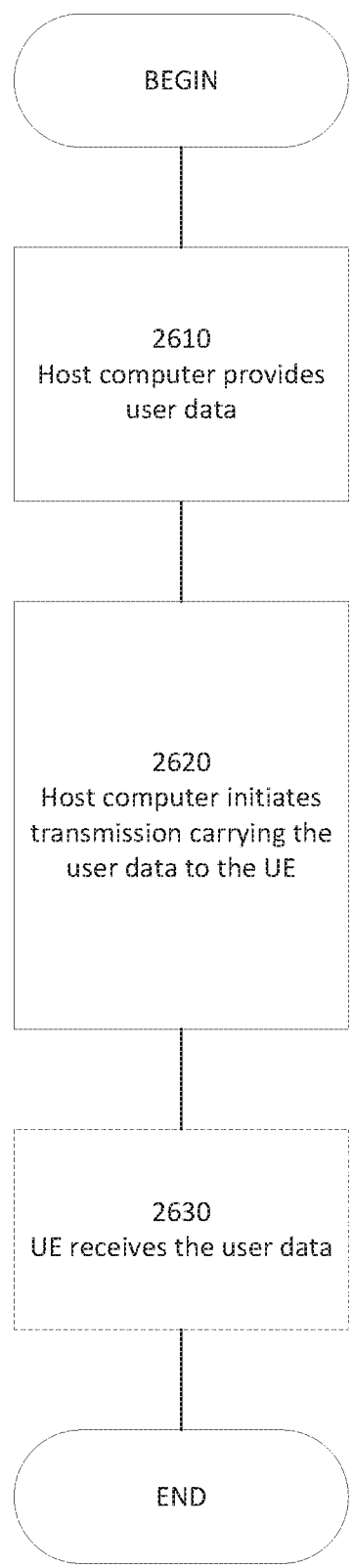
FIG. 26 is a flowchart illustrating a method implemented in a communication system, in accordance with one embodiment.

FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In step 2610 of the method, the host computer provides user data. In an optional substep (not shown) the host computer provides the user data by executing a host application. In step 2620, the host computer initiates a transmission carrying the user data to the UE. The transmission may pass via the base station, in accordance with the teachings of the embodiments described throughout this disclosure. In step 2630 (which may be optional), the UE receives the user data carried in the transmission.

Figure 27:
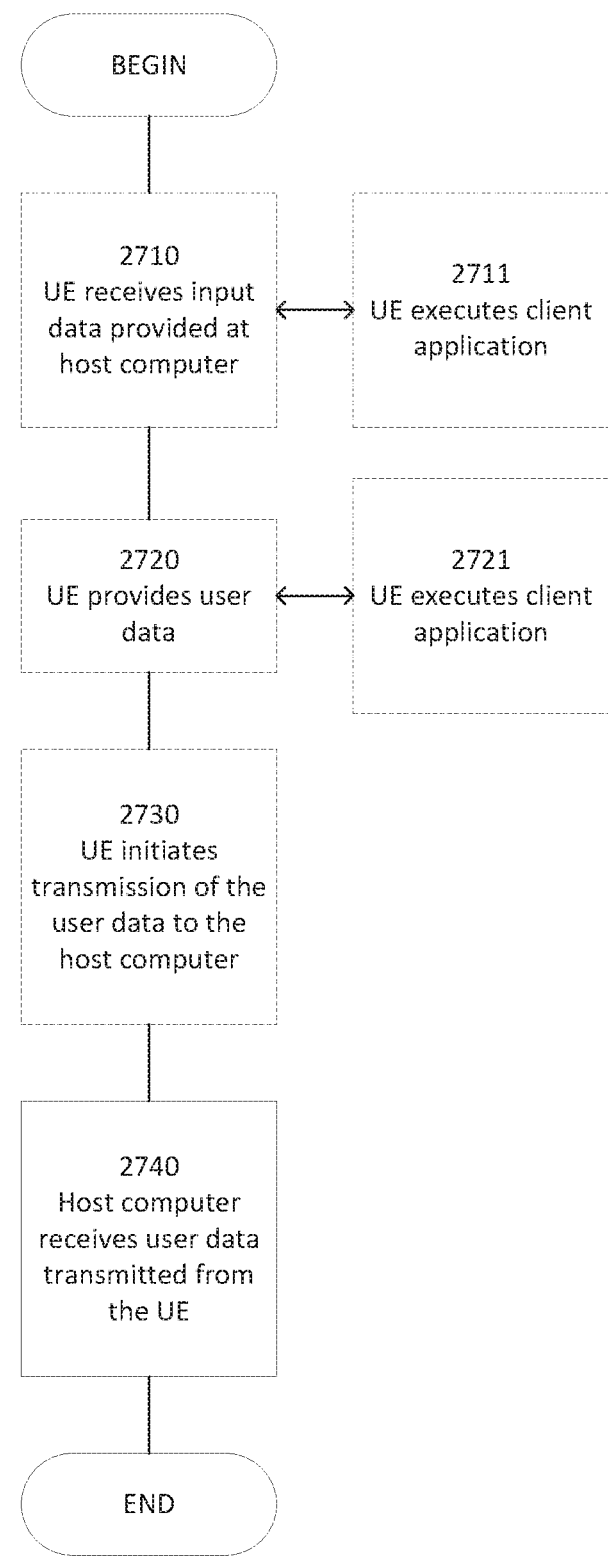
FIG. 27 is a flowchart illustrating a method implemented in a communication system, in accordance with one embodiment.

FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In step 2710 (which may be optional), the UE receives input data provided by the host computer. Additionally or alternatively, in step 2720, the UE provides user data. In substep 2721 (which may be optional) of step 2720, the UE provides the user data by executing a client application. In substep 2711 (which may be optional) of step 2710, the UE executes a client application which provides the user data in reaction to the received input data provided by the host computer. In providing the user data, the executed client application may further consider user input received from the user. Regardless of the specific manner in which the user data was provided, the UE initiates, in substep 2730 (which may be optional), transmission of the user data to the host computer. In step 2740 of the method, the host computer receives the user data transmitted from the UE, in accordance with the teachings of the embodiments described throughout this disclosure.

Figure 28:
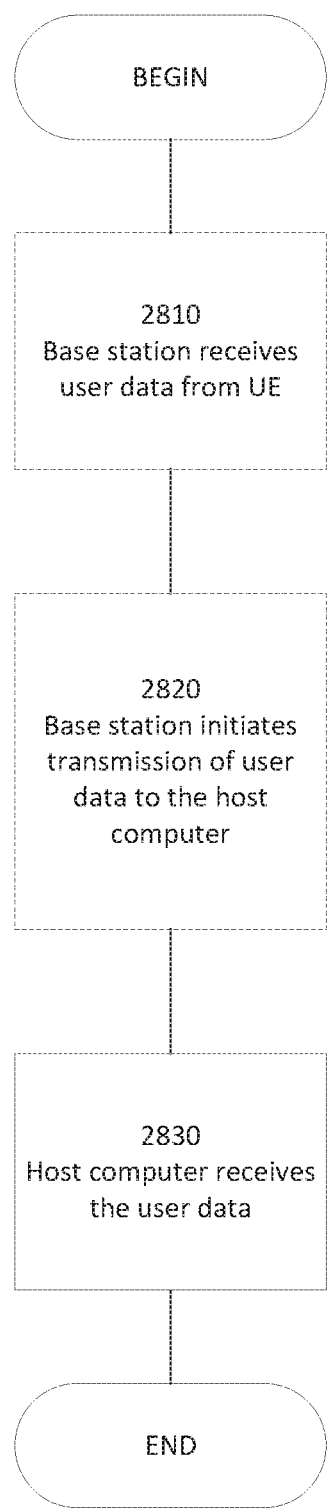
FIG. 28 is a flowchart illustrating a method implemented in a communication system, in accordance with one embodiment.

FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In step 2810 (which may be optional), in accordance with the teachings of the embodiments described throughout this disclosure, the base station receives user data from the UE. In step 2820 (which may be optional), the base station initiates transmission of the received user data to the host computer. In step 2830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by core network equipment configured for use in a core network of a wireless communication system, wherein the wireless communication system comprises the core network and a radio access network, the method comprising:
    switching to using a new non-access stratum, NAS, security context between a user equipment and the core network equipment; and
    during or in association with a handover procedure for handover of the user equipment, signaling from the core network equipment that the new NAS security context between the user equipment and the core network equipment is to be used as a basis for an access stratum (AS) security context between the user equipment and radio access network equipment; wherein
    the signaling is performed in response to determining that the new NAS security context has been activated, that the new NAS security context is different from a NAS security context on which a currently active AS security context is based, and that the core network equipment has not yet performed an explicit security context modification procedure that prompts the radio access network equipment included in the radio access network and the user equipment to switch to using a new AS security context based on the new NAS security context.

2. The method of claim 1, wherein the handover procedure is for handover of the user equipment to target radio access network equipment, wherein the method further comprises receiving a path switch request from the target radio access network equipment after the handover procedure, and wherein the signaling comprises, after the handover procedure, transmitting a path switch request acknowledgement message to the target radio access network equipment responsive to the path switch request, wherein the path switch request acknowledgement message includes a field indicating that the new NAS security context is to be used as a basis for the AS security context.

3. The method of claim 2, wherein the field is a new security context indicator field.

4. The method of claim 1, wherein the handover procedure is for handover of the user equipment from source radio access network equipment to target radio access network equipment, wherein the core network equipment comprises source core network equipment associated with the source radio access network equipment, and wherein the signaling comprises, during the handover procedure and responsive to receiving a handover required message from the source radio access network equipment, transmitting a forward relocation request message from the core network equipment to target core network equipment associated with the target radio access network equipment, wherein the forward relocation request message includes a field indicating that the new NAS security context is to be used as a basis for the AS security context.

5. The method of claim 1, wherein the handover procedure is for handover of the user equipment from source radio access network equipment to target radio access network equipment, and wherein the signaling comprises, during the handover procedure, transmitting a handover request message from the core network equipment to the target radio access network equipment, wherein the handover request message includes a field that indicates that the new NAS security context is to be used as a basis for the AS security context.

6. The method of claim 4, wherein the field is a key change indictor field that indicates a NAS security context key has changed.

7. The method of claim 1, wherein the core network equipment implements an access and mobility management function, AMF, in a core network.

8. A wireless communication system comprising a core network and a radio access network, wherein the core network comprises the core network equipment comprising processing circuitry, memory and transceiver circuitry, collectively configured to:
    switch to using a new non-access stratum, NAS, security context between a user equipment and the core network equipment; and
    during or in association with a handover procedure for handover of the user equipment, signal from the core network equipment that the new NAS security context between the user equipment and the core network equipment is to be used as a basis for an access stratum AS security context between the user equipment and radio access network equipment; wherein
    the signaling is performed in response to a determination that the new NAS security context has been activated, that the new NAS security context is different from a NAS security context on which a currently active AS security context is based, and that the core network equipment has not yet performed an explicit security context modification procedure that prompts a radio access network equipment included in the radio access network and the user equipment to switch to using a new AS security context based on the new NAS security context.

9. The wireless communication system of claim 8, wherein the handover procedure is for handover of the user equipment to target radio access network equipment, wherein the core network is further configured to receive a path switch request from the target radio access network equipment after the handover procedure, and wherein the signaling comprises, after the handover procedure, transmitting a path switch request acknowledgement message to the target radio access network equipment responsive to the path switch request, wherein the path switch request acknowledgement message includes a field indicating that the new NAS security context is to be used as a basis for the AS security context.

10. The wireless communication system of claim 9, wherein the field is a new security context indicator field.

11. The wireless communication system of claim 8, wherein the handover procedure is for handover of the user equipment from source radio access network equipment to target radio access network equipment, wherein the core network equipment comprises source core network equipment associated with the source radio access network equipment, and wherein the signaling comprises, during the handover procedure and responsive to receiving a handover required message from the source radio access network equipment, transmitting a forward relocation request message from the core network equipment to target core network equipment associated with the target radio access network equipment, wherein the forward relocation request message includes a field indicating that the new NAS security context is to be used as a basis for the AS security context.

12. The wireless communication system of claim 8, wherein the handover procedure is for handover of the user equipment from source radio access network equipment to target radio access network equipment, and wherein the signaling comprises, during the handover procedure, transmitting a handover request message from the core network equipment to the target radio access network equipment, wherein the handover request message includes a field that indicates that the new NAS security context is to be used as a basis for the AS security context.

13. The wireless communication system of claim 11, wherein the field is a key change indictor field that indicates a NAS security context key has changed.

14. The wireless communication system of claim 8, wherein the core network equipment implements an access and mobility management function, AMF, in a core network.

15. Core network equipment configured for use in a core network of a wireless communication system, wherein the wireless communication system comprises the core network and a radio access network, the core network equipment comprising:
  processing circuitry and memory, the memory containing instructions executable by the processing circuitry whereby the core network equipment is configured to:
    switch to using a new non-access stratum, NAS, security context between a user equipment and the core network equipment; and
    during or in association with a handover procedure for handover of the user equipment, signal from the core network equipment that the new NAS security context between the user equipment and the core network equipment is to be used as a basis for an access stratum AS security context between the user equipment and radio access network equipment; wherein
  the signaling is performed in response to a determination that the new NAS security context has been activated, that the new NAS security context is different from a NAS security context on which a currently active AS security context is based, and that the core network equipment has not yet performed an explicit security context modification procedure that prompts a radio access network equipment included in the radio access network and the user equipment to switch to using a new AS security context based on the new NAS security context.

16. The core network equipment of claim 15, wherein the handover procedure is for handover of the user equipment to target radio access network equipment, wherein the core network equipment is further configured to receive a path switch request from the target radio access network equipment after the handover procedure, and wherein the signaling comprises, after the handover procedure, transmitting a path switch request acknowledgement message to the target radio access network equipment responsive to the path switch request, wherein the path switch request acknowledgement message includes a field indicating that the new NAS security context is to be used as a basis for the AS security context.

17. The core network equipment of claim 16, wherein the field is a new security context indicator field.

18. The core network equipment of claim 15, wherein the handover procedure is for handover of the user equipment from source radio access network equipment to target radio access network equipment, wherein the core network equipment comprises source core network equipment associated with the source radio access network equipment, and wherein the signaling comprises, during the handover procedure and responsive to receiving a handover required message from the source radio access network equipment, transmitting a forward relocation request message from the core network equipment to target core network equipment associated with the target radio access network equipment, wherein the forward relocation request message includes a field indicating that the new NAS security context is to be used as a basis for the AS security context.

19. The core network equipment of claim 15, wherein the handover procedure is for handover of the user equipment from source radio access network equipment to target radio access network equipment, and wherein the signaling comprises, during the handover procedure, transmitting a handover request message from the core network equipment to the target radio access network equipment, wherein the handover request message includes a field that indicates that the new NAS security context is to be used as a basis for the AS security context.

20. The core network equipment of claim 18, wherein the field is a key change indictor field that indicates a NAS security context key has changed.

21. The core network equipment of claim 15, wherein the core network equipment implements an access and mobility management function, AMF, in a core network.

* * * * *

UNITED STATES PATENT AND TRADEMARK OFFICE
CERTIFICATE OF CORRECTION

Page 1 of 2

PATENT NO. : 10,939,334 B2
APPLICATION NO. : 16/321563
DATED : March 2, 2021
INVENTOR(S) : Nakarmi et al.

It is certified that error appears in the above-identified patent and that said Letters Patent is hereby corrected as shown below:

On the Title Page

Item [56], Page 2, Column 2, Line 2, delete "Ljublijana," and insert -- Ljubljana, --, therefor.

In the Specification

Column 2, Line 27, delete "indictor" and insert -- indicator --, therefor.

Column 2, Line 39, delete "indictor" and insert -- indicator --, therefor.

Column 3, Line 36, delete "indictor" and insert -- indicator --, therefor.

Column 7, Line 36, delete "signaling 22" and insert -- signaling 26 --, therefor.

Column 7, Line 38, delete "signaling 22," and insert -- signaling 26, --, therefor.

Column 7, Line 40, delete "core network equipment 12" and insert -- core network equipment 16 --, therefor.

Column 8, Line 30, delete "based" and insert -- based on --, therefor.

Column 8, Line 38, delete "us," and insert -- use, --, therefor.

Column 9, Line 30, delete "based" and insert -- based on --, therefor.

Column 9, Line 38, delete "us," and insert -- use, --, therefor.

Column 10, Lines 16-17, delete "second handover procedure 430" and insert -- second handover procedure 460 --, therefor.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,939,334 B2

Column 12, Line 15, delete "handover unit or module 610" and insert -- handover unit or module 620 --, therefor.

Column 13, Line 23, delete "signalling unit or module 1010" and insert -- transmit unit or module 1010 --, therefor.

Column 13, Line 32, delete "determining unit or module 1020" and insert -- receive unit or module 1020 --, therefor.

Column 13, Lines 34-35, delete "using unit or module 1030" and insert -- determination unit or module 1030 --, therefor.

Column 13, Line 43, delete "carry" and insert -- to carry --, therefor.

Column 19, Line 4, delete "K-gNB" and insert -- K_gNB --, therefor.

Column 19, Line 33, delete "may" and insert -- may be --, therefor.

Column 19, Line 45, delete "aware" and insert -- aware of --, therefor.

Column 20, Line 43, delete "NH)" and insert -- NH --, therefor.

Column 22, Line 11, delete "K" and insert -- $K_{AMF}$ --, therefor.

Column 23, Line 44, delete "1410)." and insert -- 1610). --, therefor.

Column 26, Line 28, delete "based an" and insert -- based on --, therefor.

In the Claims

Column 36, Line 7, Claim 6, delete "indictor" and insert -- indicator --, therefor.

Column 37, Line 12, Claim 13, delete "indictor" and insert -- indicator --, therefor.

Column 38, Line 41, Claim 20, delete "indictor" and insert -- indicator --, therefor.